United States Patent
Yamamoto et al.

(10) Patent No.: US 11,331,648 B2
(45) Date of Patent: May 17, 2022

(54) COMPOSITE MATERIAL, GAS ADSORBENT, AND METHOD FOR PRODUCING COMPOSITE MATERIAL

(71) Applicant: Japan Science and Technology Agency, Kawaguchi (JP)

(72) Inventors: Takaiku Yamamoto, Kawaguchi (JP); Masaya Matsuoka, Sakai (JP); Yu Horiuchi, Sakai (JP)

(73) Assignee: Japan Science and Technology Agency, Kawaguchi (JP)

( * ) Notice: Subject to any disclaimer, the term of this patent is extended or adjusted under 35 U.S.C. 154(b) by 536 days.

(21) Appl. No.: 16/333,621

(22) PCT Filed: Sep. 29, 2017

(86) PCT No.: PCT/JP2017/035539
§ 371 (c)(1),
(2) Date: Mar. 15, 2019

(87) PCT Pub. No.: WO2018/062504
PCT Pub. Date: Apr. 5, 2018

(65) Prior Publication Data
US 2019/0217271 A1 Jul. 18, 2019

(30) Foreign Application Priority Data

Sep. 30, 2016 (JP) .............................. JP2016-193391

(51) Int. Cl.
*B01J 20/22* (2006.01)
*B01J 20/28* (2006.01)
*B01J 20/26* (2006.01)
*B01J 20/30* (2006.01)
*B01J 20/32* (2006.01)
*B01D 53/02* (2006.01)
*C08G 77/06* (2006.01)
*C08L 83/04* (2006.01)
*C08L 101/00* (2006.01)

(52) U.S. Cl.
CPC .......... *B01J 20/226* (2013.01); *B01D 53/02* (2013.01); *B01J 20/22* (2013.01); *B01J 20/262* (2013.01); *B01J 20/28* (2013.01); *B01J 20/28085* (2013.01); *B01J 20/30* (2013.01); *B01J 20/3071* (2013.01); *B01J 20/3212* (2013.01); *B01J 20/3272* (2013.01); *C08G 77/06* (2013.01); *C08L 83/04* (2013.01); *C08L 101/00* (2013.01); *B01D 2253/204* (2013.01); *B01D 2257/502* (2013.01)

(58) Field of Classification Search
CPC ........ B01J 20/22; B01J 20/226; B01J 20/262; B01J 20/28; B01J 20/3071; B01J 20/3212; B01J 20/3272; B01J 2253/204; B01D 53/02; B01D 2253/204; B01D 2257/502; C08G 77/06; C08L 83/04; C08L 101/00
USPC ........................................................ 502/402
See application file for complete search history.

(56) References Cited

U.S. PATENT DOCUMENTS

2008/0227634 A1 9/2008 Muller et al.

FOREIGN PATENT DOCUMENTS

| JP | 2009519116 A | 5/2009 |
|----|--------------|--------|
| JP | 201296960 A | 5/2012 |
| JP | 201637594 A | 3/2016 |
| WO | 2007013119 A1 | 2/2007 |
| WO | 2015012373 A1 | 1/2015 |

OTHER PUBLICATIONS

Hong et al., "Manufacturing of metal-organic framework monoliths and their application in CO2 adsorption", Microporous and Mesoporous Materials, 2015, pp. 149-155, vol. 214.
Ren et al., "Ni foam-immobilized MIL-101(Cr) nanocrystals toward system integration for hydrogen storage", Journal of Alloys and Compounds, 2015, pp. S170-S173, vol. 645.
Song et al., "Porous Cu-BTC silica monoliths as efficient heterogeneous catalysts for the selective oxidation of alkylbenzenes", RSC Advances, 2014, pp. 30221-30224, vol. 4.
Uemura et al., "Incarceration of Nanosized Silica into Porous Coordination Polymers: Preparation, Characterization, and Adsorption Property", Chemistry of Materials, 2011, pp. 1736-1741, vol. 23.
Ulker et al., "Novel nanostructured composites of silica aerogels with a metal organic framework", Microporous and Mesoporous Materials, 2013, pp. 352-358, vol. 170.

*Primary Examiner* — Edward M Johnson
(74) *Attorney, Agent, or Firm* — The Webb Law Firm

(57) ABSTRACT

A composite material containing a porous body having pores inside the porous body and a porous coordination polymer compound (PCP), in which the porous body has a network structure of Si—O bonds obtained by copolymerizing a dialkoxysilane and a trialkoxysilane, and the porous coordination polymer compound is carried in the pores of the porous body. Also, a method for producing a composite material containing a porous body having pores inside the porous body and a porous coordination polymer compound, in which the porous body has a network structure of Si—O bonds obtained by copolymerizing a dialkoxysilane and a trialkoxysilane, and the porous coordination polymer compound is carried in the pores of the porous body via a solvent.

20 Claims, 11 Drawing Sheets

COMPOSITE MATERIAL, GAS ADSORBENT, AND METHOD FOR PRODUCING COMPOSITE MATERIAL

CROSS-REFERENCE TO RELATED APPLICATIONS

This application is the United States national phase of International Application No. PCT/JP2017/035539 filed Sep. 29, 2017, and claims priority to Japanese Patent Application No. 2016-193391 filed Sep. 30, 2016, the disclosure of each of which is hereby incorporated by reference in its entirety.

TECHNICAL FIELD

The present invention relates to a composite material, a gas adsorbent, and a method for producing a composite material, and in particular, relates to a composite material on which a porous coordination polymer compound is carried, a gas adsorbent, and a method for producing a composite material.

BACKGROUND ART

A porous coordination polymer compound (PCP) is a porous material having nanopores, in which metal ions and organic ligands form a three-dimensional coordination network, and has various characteristics such as a regular pore structure, a high specific surface area, and a flexible structure. For this reason, the PCP is expected to play a role as a highly designed functional material, and for example, applications of the PCP to a gas adsorbent, a gas storage material, and the like have been developed.

In practical application of the PCP, a technique for shaping a PCP is essential. Conventionally, several methods are known as a shaping technique for a PCP. For example, in Non Patent Literature 1, a composite obtained by synthesizing a PCP in macropores of a silica monolith having the macropores has been disclosed. In the PCP of this literature, "Cu-BTC" (that is, $[Cu_3(BTC)_2]$ (in this regard, BTC is 1,3,5-benzenetricarboxylic acid)) is used, and there is a description that the composite is a Cu-BTC-$SiO_2$ monolith.

Further, in Non Patent Literature 2, a composite obtained by mixing a PCP (Cu-BTC) adjusted in advance with a precursor solution of a silica aerogel and turning the mixture into a gel has been disclosed. In the PCP of this literature, "Cu-BTC" is used similarly as in Non Patent Literature 1, and there is a description that the silica aerogel is synthesized from tetraethyl orthosilicate (TEOS).

Furthermore, in Non Patent Literature 3, a composite obtained by hardening and molding a paste of bentonite clay and a PCP has been disclosed. In the PCP of this literature, "MIL-101 (Cr)" (that is, $[Cr_3O(OH) (—H_2O)_2(BDC)_3]\cdot x H_2O$ (in this regard, BDC is 1,4-benzenedicarboxylic acid)) is used.

In addition, in Non Patent Literature 4, a composite material in which a nickel metal skeleton is coated with a PCP by spraying a PCP suspension containing 3 wt % polytetrafluoroethylene (PTFE) as a binder to a foam body of a nickel metal has been disclosed. In the PCP of this literature, "MIL-101(Cr)" is used similarly as in Non Patent Literature 3.

On the other hand, conventionally, a flexible material called a marshmallow-like gel, which is a copolymer of a bi- or more-functional alkoxysilane, is known. For example, in Patent Literature 1, a copolymer of an alkoxysilane having a specific partial structure has been disclosed, and there is a description in Examples that a chelate silica xerogel is used as a metal-ion removing material.

Patent Literature 1: JP 2016-37594 A (claim 1, Example 2, and the like)

Non Patent Literature

Non Patent Literature 1: Song et al., "Porous Cu-BTC silica monoliths as efficient heterogeneous catalysts for the selective oxidation of alkylbenzenes", RSC adv., 2014, 4, 30221-30224.

Non Patent Literature 2: Ulker et al., "Novel nanostructured composites of silica aerogels with a metal organic framework", Micropor. Mesopor. Mater., 2013, 170, 352-358.

Non Patent Literature 3: Hong et al., "Manufacturing of metal-organic framework monoliths and their application in CO2 adsorption", Micropor. Mesopor. Mater., 2015, 214, 149-155.

Non Patent Literature 4: Ren et al., "Ni foam-immobilized MIL-101(Cr) nanocrystals toward system integration for hydrogen strage", J. Alloys Comp., 2015, 645, S170-S173.

SUMMARY OF INVENTION

In each of Non Patent Literatures 1 to 4, a shaping technique for introducing a PCP in a carrier has been disclosed, however, in any case, it has been difficult to carry the PCP to a carrier with a high filling rate while maintaining the properties of the PCP.

That is, in each of Non Patent Literatures 3 and 4, there is a description that the PCP is introduced at a relatively high introduction rate, however, in these literatures, the PCP is carried on a carrier by using a binder. In general, since a binder tends to degrade the properties of a PCP, it is difficult to carry the PCP on a carrier while maintaining the properties of the PCP by the methods of these literatures. Further, in each of Non Patent Literature 1 and 2, the PCP is carried on a silica monolith that is a silane-based carrier without using a binder. However, the silica monolith in each of these literatures is obtained by polymerizing a tetrafunctional alkoxysilane, and due to the limitation of structure or physical properties of the carrier, it has been difficult to highly fill the inside of the carrier with the PCP.

On the other hand, in Patent Literature 1, there is a description that metal ions are adsorbed onto a so-called marshmallow-like gel that is a copolymer of a bi- or more-functional alkoxysilane, however, there is no description about carrying a PCP on the marshmallow-like gel.

An object of the present invention to provide a composite material on which a porous coordination polymer compound is carried with a high filling rate in a state that the properties of the porous coordination polymer compound are maintained or improved, a gas adsorbent, and a method for producing a composite material.

Solution to Problem

As a result of the intensive study to solve the problem described above, the present inventors have found that by using a marshmallow-like gel as a carrier of a PCP, the PCP can be carried on the carrier with a high filling rate in a state that the properties of the PCP are maintained or improved, and thus have completed the present invention.

That is, the present invention is a composite material, including a porous body having pores inside the porous body, and a porous coordination polymer compound, and is characterized in that the porous body has a network structure of Si—O bonds obtained by copolymerizing a dialkoxysilane and a trialkoxysilane, and the porous coordination polymer compound is carried in the pores of the porous body.

The porous body preferably has a void ratio of 50% by volume or more.

Further, the pores of the porous body preferably have an average pore diameter of 5 μm or more and 20 μm or less.

Furthermore, the ratio of a volume of the composite material to a volume of the porous body is preferably 1.0 or less.

Moreover, the complex introduction rate indicated by a mass of the porous coordination polymer compound to the total mass of the composite material is preferably 40% by mass or more.

In addition, the porous body preferably has partial structures represented by the following formulas (M1) and (M2):

[Chemical formula 1]

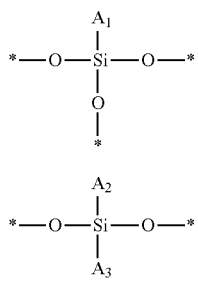

(M1)

(M2)

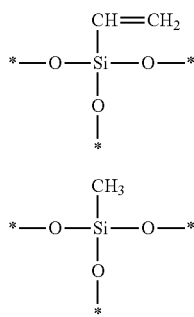

(in the formula, $A_1$ is a functional group selected from the group consisting of a vinyl group, a cyano group, an alkyl group having 1 to 5 carbon atoms, an amino group, a mercapto group, a fluoro group, an aryl group, and an epoxy group; $A_2$ and $A_3$ are functional groups selected from the group consisting of a vinyl group, a cyano group, an alkyl group having 1 to 5 carbon atoms, an amino group, a mercapto group, a fluoro group, an aryl group, and an epoxy group, and may be the same as or different from each other; and the symbol "*" represents a chemical bond and means to bond to adjacent Si.)

Further, the formula (M1) is preferably one or more kinds selected from the group consisting of the following formulas (M1-1), (M1-2), and (M1-3):

[Chemical formula 2]

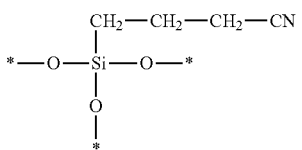

(M1-1)

(M1-2)

(M1-3)

(in the formula, the symbol "*" represents a chemical bond and means to bond to adjacent Si.) Furthermore, the formula (M2) is preferably one or more kinds selected from the group consisting of the following formulas (M2-1), (M2-2), and (M2-3):

[Chemical formula 3]

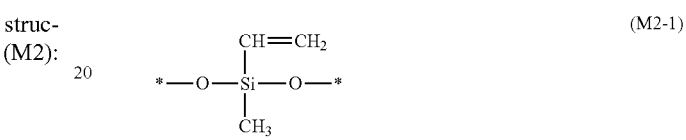

(M2-1)

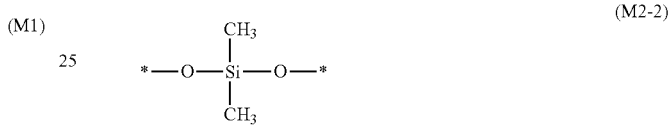

(M2-2)

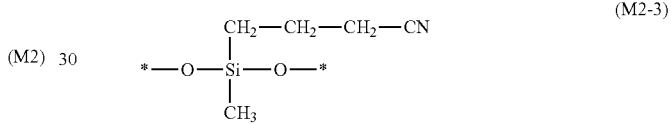

(M2-3)

(in the formula, the symbol "*" represents a chemical bond and means to bond to adjacent Si.)

In addition, it is suitable that the porous coordination polymer compound has a structure in which an organic ligand is coordinated to a metal ion, the metal ion is a divalent to tetravalent metal ion, and the organic ligand is a compound having a carboxyl group, a pyridyl group, or an imidazole group.

Further, the porous coordination polymer compound is preferably a porous coordination polymer compound containing a divalent to tetravalent metal ion and a divalent aromatic carboxylic acid having two COOH groups at meta positions.

Furthermore, the porous coordination polymer compound preferably has a structure represented by the following formula (P1):

[Chemical formula 4]

$$\{M(OOC-Y_1-COO)\}_2 \qquad (P1)$$

(in the formula, M is a divalent, trivalent, or tetravalent metal ion selected from the group consisting of $Cu^{2+}$, $Zn^{2+}$, $Ru^{2+}$, $Rh^{2+}$, $Mo^{2+}$, $Fe^{3+}$, $Al^{3+}$, $Ti^{4+}$, and $Co^{3+}$; and $Y_1$ represents a divalent aromatic group having adjacent two COOH groups at meta positions.)

The present invention is a gas adsorbent that is characterized by including the composite material described in any one of the above.

In addition, the present invention is a method for producing a composite material containing a porous body having pores inside the porous body and a porous coordination polymer compound, and is characterized in that the porous body has a network structure of Si—O bonds obtained by copolymerizing a dialkoxysilane and a trialkoxysilane, and the porous coordination polymer compound is carried in the pores of the porous body via a solvent.

Further, the method for producing a composite material preferably includes a washing step of removing the porous coordination polymer compound that has not been carried on the porous body after the porous coordination polymer compound is brought into contact with the porous body, and a drying step of drying the solvent.

Moreover, the solvent suitably has a property of swelling the porous body.

In this case, the solvent is preferably at least one kind selected from the group consisting of methanol, ethanol, 1-propanol, 2-propanol, 1-butanol, 2-butanol, benzene, hexane, acetaldehyde, acetone, cyclohexane, and N,N-dimethylformamide.

In addition, it is preferred that the porous body has partial structures represented by the following formulas (M1) and (M2):

[Chemical formula 5]

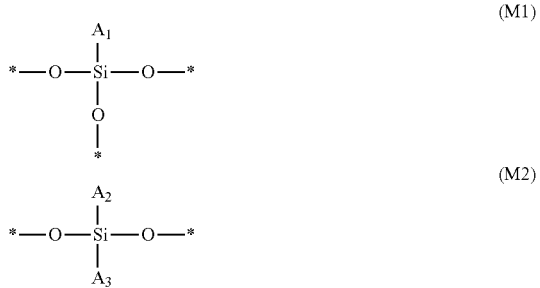

(in the formula, $A_1$ is a functional group selected from the group consisting of a vinyl group, a cyano group, an alkyl group having 1 to 5 carbon atoms, an amino group, a mercapto group, a fluoro group, an aryl group, and an epoxy group; $A_2$ and $A_3$ are functional groups selected from the group consisting of a vinyl group, a cyano group, an alkyl group having 1 to 5 carbon atoms, an amino group, a mercapto group, a fluoro group, an aryl group, and an epoxy group, and may be the same as or different from each other; and the symbol "*" represents a chemical bond and means to bond to adjacent Si), and is produced by copolymerizing a compound represented by the following formula (M3) with a compound represented by the following formula (M4):

[Chemical formula 6]

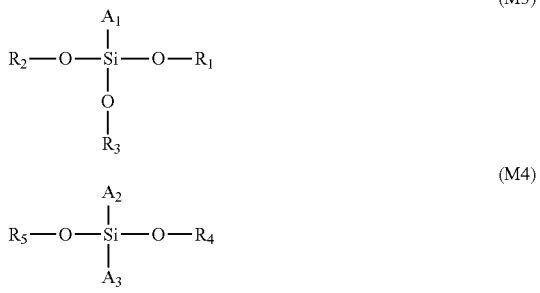

(in the formula, $R_1$ to $R_5$ each are an alkyl group having 1 to 5 carbon atoms and may be the same as or different from each other, and $A_1$ to $A_3$ are the same as the above.)

Further, the method for producing a composite material suitably includes a dispersion liquid adjustment step of adjusting a dispersion liquid of a porous coordination polymer compound by dispersing the porous coordination polymer compound in the solvent, and a contact step of bringing the dispersion liquid into contact with the porous body to introduce the porous coordination polymer compound into the pores are suitably included.

Furthermore, in the contact step, the porous body is preferably brought into contact with the dispersion liquid while being swelled.

Moreover, the method for producing a composite material preferably includes a drying step of removing the solvent from the porous body after the contact step.

In addition, in these cases, in the contact step, when a volume of the porous body before the contact is taken as V0 and a volume of the porous body after the contact is taken as V1, a volume expansion rate (V1/V0) of the porous body is preferably in a range of 1.2 to 2.0.

Further, the present invention is a method for producing a composite material containing a porous body having pores inside the porous body and a porous coordination polymer compound, and is characterized in that the porous coordination polymer compound is carried in the pores of the porous body via a solvent.

In this case, the method for producing a composite material preferably includes a dispersion liquid adjustment step of adjusting a dispersion liquid of a porous coordination polymer compound by dispersing the porous coordination polymer compound in the solvent, and a contact step of bringing the dispersion liquid into contact with the porous body to introduce the porous coordination polymer compound into the pores.

Advantageous Effects of Invention

According to the present invention, a composite material on which a porous coordination polymer compound is carried with a high filling rate in a state that the properties of the porous coordination polymer compound are maintained or improved, a gas adsorbent, and a method for producing a composite material can be provided.

DESCRIPTION OF THE INVENTION

1. Composite Material

Figure 1:
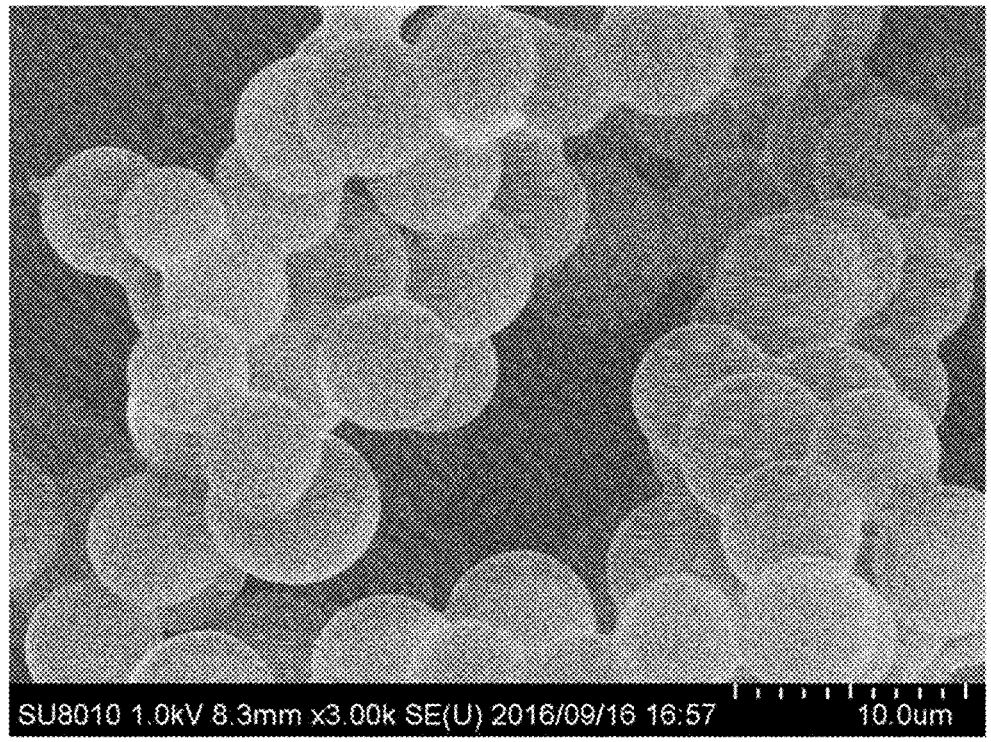
FIG. 1 is SEM images of a porous body and a composite material of Examples.
Figure 1:
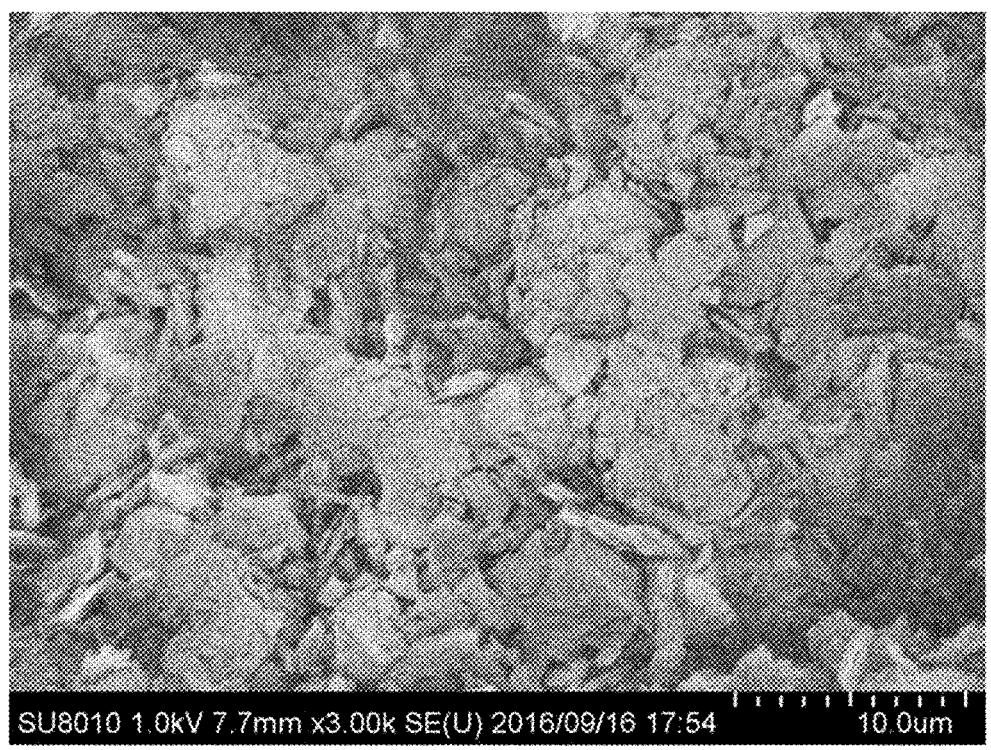

Hereinafter, the composite material according to the present invention will be described. The composite material according to the present invention is a material obtained by combining a porous body having pores inside the porous body and a porous coordination polymer compound. The porous body has a network structure of Si—O bonds obtained by copolymerizing a dialkoxysilane and a trialkoxysilane, and the porous coordination polymer compound is carried in the pores of the porous body. Hereinafter, each member will be described in detail.

(1) Porous Coordination Polymer Compound

The porous coordination polymer compound is a porous compound having nanopores in which metal ions and organic ligands form a three-dimensional coordination network. In more detail, the porous coordination polymer compound is a porous material in which a crystalline polymer structure having spaces (nanopores) inside the structure is formed by combining various metal ions and crosslinkable organic ligands that connect the metal ions, and has an internal space formed by assembling crystals while the crystals are grown three-dimensionally. Note that in the present specification, the porous coordination polymer compound may be simply referred to as "PCP".

(Metal Ion)

As the metal ion constituting a porous coordination polymer compound, any metal ion may be used as long as it can form a porous material by combining with an organic ligand. As such a metal ion, a transition metal can be used. Specific examples of the metal ion include various kinds of ions of nickel, copper, zinc, ruthenium, rhodium, molybdenum, chromium, iron, titanium, zirconium, and the like. Hexavalent molybdenum and hexavalent chromium may be accepted. As a specific example of the metal suitably used in the present invention, a divalent or higher-valent metal ion, and preferably a divalent to tetravalent metal ion can be mentioned. Specific examples of the metal ion described above include a nickel ion ($Ni^{2+}$), a copper ion ($Cu^{2+}$), a zinc ion ($Zn^{2+}$), a ruthenium ion ($Ru^{2+}$), a rhodium ion ($Rh^{2+}$), a molybdenum ion ($Mo^{2+}$), a cobalt ion ($Co^{2+}$, $Co^{3+}$), a chromium ion ($Cr^{3+}$), an iron ion ($Fe^{2+}$, $Fe^{3+}$), a titanium ion ($Ti^{4+}$), a zirconium ion ($Zr^{4+}$), and an aluminum ion ($Al^{3+}$).

In selecting the metal ion, taking the ease of production of the porous coordination polymer compound, the stability, the application and the like into consideration, and further taking the ease of the incorporation into the porous substance of the present invention, the stability of adsorption characteristics and the like into consideration in the present invention, the selection is performed. When such a consideration is taken, copper, zirconium, chromium, and the like can be mentioned, and from the viewpoint of the ease of the combination and the like, it is more preferred to use copper, zirconium or the like in relation to the porous substance.

(Organic Ligand)

As the organic ligand constituting a porous coordination polymer compound, any organic ligand may be used as long as it can form a porous material by combining with a metal ion, and an oxygen donor ligand, a nitrogen donor ligand, and the like can be mentioned. Further, as the kind of the organic ligand, any of a monodentate ligand, and a multidentate ligand (bidentate ligand or tridentate or higher ligand) may be used.

As the oxygen donor ligand, a compound having a carboxyl group, such as an aromatic carboxylic acid, and an aliphatic carboxylic acid can be mentioned. As the compound having a carboxyl group, a compound having two or more carboxyl groups in the molecule is preferred, and in particular, a compound having at least one unsaturated carbon-carbon bond between two carboxyl groups (that is a double bond or a triple bond, and may be a single bond or a ring structure such as a benzene ring or a heterocyclic ring) is preferred.

Specific examples of the aromatic carboxylic acid include a benzenedicarboxylic acid such as phthalic acid, isophthalic acid, and terephthalic acid, and a benzenetricarboxylic acid such as 1,2,3-benzenetricarboxylic acid, 1,2,4-benzenetricarboxylic acid, and 1,3,5-benzenetricarboxylic acid. Further, specific examples of the aliphatic carboxylic acid include fumaric acid, and maleic acid.

In particular, as the benzenedicarboxylic acid, compounds represented by the following formulas (L1) to (L6) are preferred.

[Chemical formula 7]

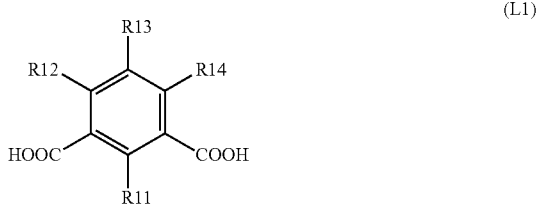

(L1)

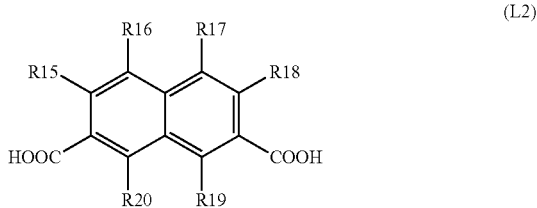

(L2)

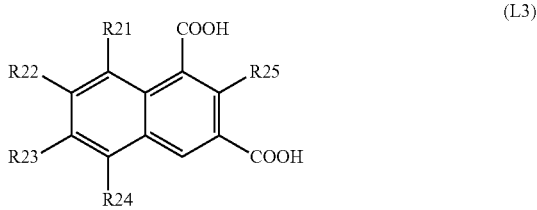

(L3)

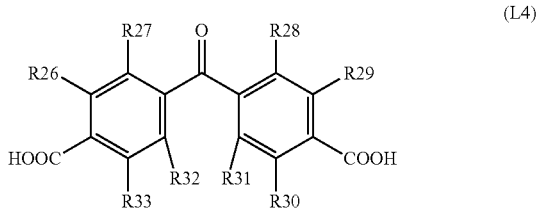

(L4)

-continued

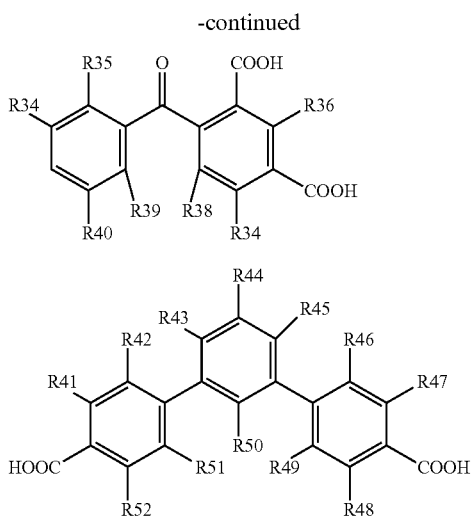

(L5)

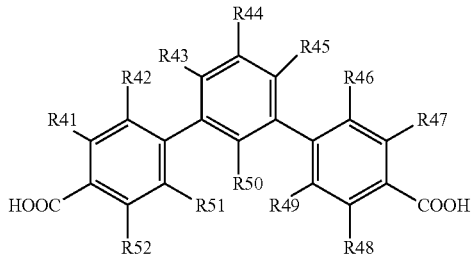

(L6)

(in the formula, R11 to R52 each are selected from the group consisting of a hydrogen atom, an alkyl group, an aryl group, an alkoxy group, an amino group ($NH_2$), an amide group ($CONH_2$), an azido group ($N_3$), an acetylamino group, a nitro group, and a halogen atom, these may be replaced with a substituent and/or a halogen atom, and R11 to R52 may be the same as or different from each other.)

In this regard, examples of the alkyl group include a linear or branched alkyl group having 1 to 4 carbon atoms such as a methyl group, an ethyl group, an n-propyl group, an isopropyl group, an n-butyl group, an isobutyl group, a sec-butyl group, and a tert-butyl group. Further, examples of the aryl group include a phenyl group, and a naphthyl group. In addition, examples of the alkoxy group include a linear or branched alkoxy group having 1 to 4 carbon atoms such as a methoxy group, an ethoxy group, an n-propoxy group, an isopropoxy group, an n-butoxy group, an isobutoxy group, a sec-butoxy group, and a tert-butoxy group. Further, examples of the halogen atom include a chlorine atom, a fluorine atom, a bromine atom, and an iodine atom.

These may partially contain an unsaturated bond (double bond, or triple bond). Further, these may be partially replaced with a substituent or a halogen atom. Examples of the substituent include an alkyl group, an aryl group, an alkoxy group, and an amino group, and examples of the halogen atom include a chlorine atom, a fluorine atom, a bromine atom, and an iodine atom. In addition, in formulas L1 to L6, the number of substituents (R) in one molecule is 1 to 4, preferably 1 to 3, more preferably 1 or 2, and particularly 1.

In a case where the benzenedicarboxylic acid is isophthalic acid of formula L1, one having a substituent at the 5-position is preferred, and for example, 5-azidoisophthalic acid, 5-methylisophthalic acid, 5-methoxyisophthalic acid, 5-heptafluoropropyl isophthalic acid, and the like can be mentioned.

As the nitrogen donor ligand, a compound having two or more pyridyl groups in the molecule, or a compound having an imidazole group can be mentioned. As such a compound, 4,4'-bipyridine, imidazole, phenanthroline, and the like can be mentioned.

(Coordination Structure Between Metal Ion and Organic Ligand)

It is preferred that the porous coordination polymer compound has a structure in which an organic ligand is coordinated to a metal ion, the metal ion is a divalent to tetravalent metal ion, and the organic ligand is a compound having a carboxyl group, a pyridyl group, or an imidazole group. The porous coordination polymer compound has a structure in which 1 or 2 or more organic ligands are coordinated centering around the above-described metal ion. The coordination structure may be any of a linear shape, a planar square shape, a regular tetrahedron shape, a regular octahedron shape, and the like.

In particular, as the porous coordination polymer compound, one having a binuclear metal cluster structure in which an aromatic carboxylic acid is coordinated to a divalent metal ion is preferred. In this case, one having a structure represented by the following formula (P1) is particularly preferred.

[Chemical formula 8]

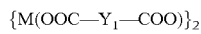

$$\{M(OOC—Y_1—COO)\}_2 \quad (P1)$$

(a nickel ion ($Ni^{2+}$), a copper ion ($Cu^{2+}$), a zinc ion ($Zn^{2+}$), a ruthenium ion ($Ru^{2+}$), a rhodium ion ($Rh^{2+}$), a molybdenum ion ($Mo^{2+}$), a cobalt ion ($Co^{2+}$, $Co^{3+}$), a chromium ion ($Cr^{3+}$), an iron ion ($Fe^{2+}$, $Fe^{3+}$), a titanium ion ($Ti^{4+}$), a zirconium ion ($Zr^{4+}$), and an aluminum ion ($Al^{3+}$), and $Y_1$ represents a divalent or trivalent aromatic group having adjacent two COOH groups at meta positions.)

In selecting the ligand of the present invention, there is no particular limitation, and one that is easily incorporated into the porous body of the present invention and is easily adsorbed is preferred. In a case where the particle size of the porous coordination polymer compound is excessively large or the dispersibility is poor when the porous coordination polymer compound is incorporated into the porous body, due to the selected ligand, favorable results may not be obtained in some cases. It is important to use the above-described ligand in order to obtain the effects of the present invention.

(Shape of Porous Coordination Polymer Compound)

The shape of the porous coordination polymer compound is not particularly limited, and a particle shape is preferred. In this case, the average particle diameter of the porous coordination polymer compound is generally 0.01 to 100 µm, and preferably 0.1 to 50 µm. In a case where the average particle diameter of the porous coordination polymer compound is within the above-described range, the particle diameter becomes appropriate, the handling tends to be easy, and the porous coordination polymer compound is easily introduced into pores of a porous body, and further, since aggregation of particles, or the like is hardly generated, the dispersibility in a solvent or the like is improved. (In a case where the average particle diameter is less than 0.01 µm, the particles are extremely small, the handle ability becomes difficult, and the particles are hardly dispersed in a solvent or the like due to the aggregation of the particles, or the like. In a case where the average particle diameter of the porous coordination polymer compound exceeds 100 µm, the particles are extremely large, and are hardly introduced into pores of a porous body.) The average particle system can be controlled by appropriately changing the combination of the ligand and the metal, which are the raw materials for producing the porous coordination polymer compound.

(Method for Producing Porous Coordination Polymer Compound)

The porous coordination polymer compound of the present invention may be obtained only by mixing a metal ion of the above-described metal element, an organic ligand, a solvent, and abase as needed, and stirring the resultant mixture, but the mixture may be placed in a pressure resistant container such as an autoclave, and reacted under pressure at high temperature.

The metal ion can be supplied into the reaction mixture by adding a metal compound soluble in a solvent to a reaction solvent. As such a metal compound, a metal sulfate, a metal acetate, a metal nitrate, a metal chloride, a metal bromide, a metal iodide, a metal perchlorate, or a metal hydroxide can be mentioned, and specifically, copper nitrate, copper acetate, copper perchlorate, or the like can be mentioned.

Further, in a case where the organic ligand is a compound having a carboxyl group, the carboxyl group may be reacted as it is in an acid state (COOH), or may be reacted in an alkali metal salt state (COONa, COOK, COOLi, or the like).

The concentration of the metal ion in reaction of the metal ion and an organic ligand is around 1 to 1000 mM (mmol/l), and the concentration of the organic ligand is around 1 to 2000 mM.

As the mixture ratio of the metal ion and the organic ligand, the molar ratio of the metal cation to the coordination bond group of the organic ligand is preferably around 1:1, and in the ratio, either one may be used excessively or largely excessively.

Into a reaction system of the metal ion and the organic ligand, a base may be added as needed. Since a base has a function of promoting deprotonation of a ligand, the addition of a base is preferred from the viewpoint of improving the reactivity. Examples of the base include an in organic base, and an organic base. Examples of the inorganic base include lithium hydroxide, sodium carbonate, potassium carbonate, sodium hydroxide, and potassium hydroxide. Examples of the organic base include triethylamine, diethylisopropylamine, pyridine, and 2,6-lutidine. Among them, from the viewpoint of the reaction acceleration, pyridine, lithium hydroxide, or sodium carbonate is preferred. The amount of the base to be added is 0.01 to 10 moles of base, and is preferably 0.05 to 5 moles, relative to 1 mole of the organic ligand.

The reaction temperature of the metal ion and the organic ligand is usually an ordinary temperature (25° C.) to 300° C., and is more preferably 250° C. or less. This is because the reaction proceeds sufficiently and the decomposition of a product is hardly generated in a case where the reaction temperature is within the above-described range. (In a case where the reaction temperature exceeds 300° C., a product may be decomposed, and in a case where the reaction temperature is lower than 25° C., the reaction hardly proceeds.)

The time and temperature of the reaction between the metal ion and the organic ligand can be appropriately set according to the scale of synthesis, and as the temperature is lower, it takes a longer time, and in general, the time is 30 minutes to 3 weeks. When the reaction is performed with a homogeneous solvent, the reaction time is around several hours, and this is not a problem, but in a case where the reaction is performed in a pressure resistant container under heterogeneous conditions, it may take a long time, specifically around one week in some cases. The reaction pressure is from normal pressure to 1 to 10 MPa, and preferably around 3 to 5 MPa.

In order to promote the synthesis reaction of the porous coordination polymer compound, a small amount of an acid such as hydrofluoric acid, hydrochloric acid, formic acid, acetic acid, and nitric acid, or an alkali such as sodium hydroxide may be added to the reaction solvent. Since an acid or an alkali interferes with the synthesis of the porous coordination polymer compound when used in a large amount, the amount is around 0.1 to 10 times mol, and preferably around 1 to 5 times mol to the amount of the ligand.

As the solvent to be used for a reaction between the metal ion and the organic ligand, any one of water, acetone, alcohols such as methanol and ethanol, and an organic solvent such as acetonitrile, tetrahydrofuran, dioxane, dimethylformamide, dimethylacetamide, toluene, and hexane may be used, and these solvents may be used alone or in combination thereof. The amount of the solvent to be used is not particularly limited, and is preferably around 10 to 2000 times the total mass of the metal ion and the organic ligand on a mass basis from the viewpoint of the ease of reaction control.

After completion of the reaction between the metal ion and the organic ligand, the product can be easily isolated by performing filtration and centrifugation of the precipitate. After the product isolation, the isolated product is washed with water or an organic solvent as needed. In order to use the isolated product as an adsorbent, it is particularly preferred to remove the solvent by rapidly heating the isolated product under reduced pressure. By removing the solvent, there is a tendency that the porous coordination polymer compound is stabilized and the porous structure is maintained. The heating temperature is suitably around 50 to 200° C. In this regard, when the obtained product is left for a long period of time, for example, several days without removing the solvent, the crystal structure of the porous coordination polymer compound changes and the specific surface area decreases, as a result of which the performance as an adsorbent or a catalyst may be impaired in some cases.

(Application of Porous Coordination Polymer Compound)

The porous coordination polymer compound has various characteristics by the combination of the metal ion and the organic ligand. The porous coordination polymer compound can be suitably used particularly as a gas separation element. Examples of the gas include carbon dioxide, hydrogen, carbon monoxide, oxygen, nitrogen, a hydrocarbon having 1 to 4 carbon atoms (such as methane, ethane, ethylene, or acetylene), a rare gas (such as helium, neon, argon, krypton, or xenon), hydrogen sulfide, ammonia, a sulfur oxide (such as SO2), a nitrogen oxide (such as NO, $NO_2$, $N_2O_4$, or $N_2O$), a siloxane (such as hexamethylcyclotrisiloxane, or octamethylcyclotetrasiloxane), water vapor, and organic steam. Among them, particularly carbon monoxide (CO) can be separated efficiently.

(2) Porous Body

In the porous body of the present invention, the network structure of Si—O bonds obtained by copolymerizing a dialkoxysilane and a trialkoxysilane has a three-dimensionally randomly connected structure in at least a part of the network structure. The network structure has pores in the inside of the network structure.

The dialkoxysilane is a silane compound in which two alkoxy groups (—OR) are bonded to silicon and two functional groups are bonded. Further, the trialkoxysilane is a silane compound in which three alkoxy groups are bonded to silicon and one functional group is bonded. The porous body of the present invention has a three-dimensional structure by a network of Si—O bonds between the dialkoxysilanes, between the trialkoxysilanes, and between the dialkoxysilane and the trialkoxysilane.

Figure 2:
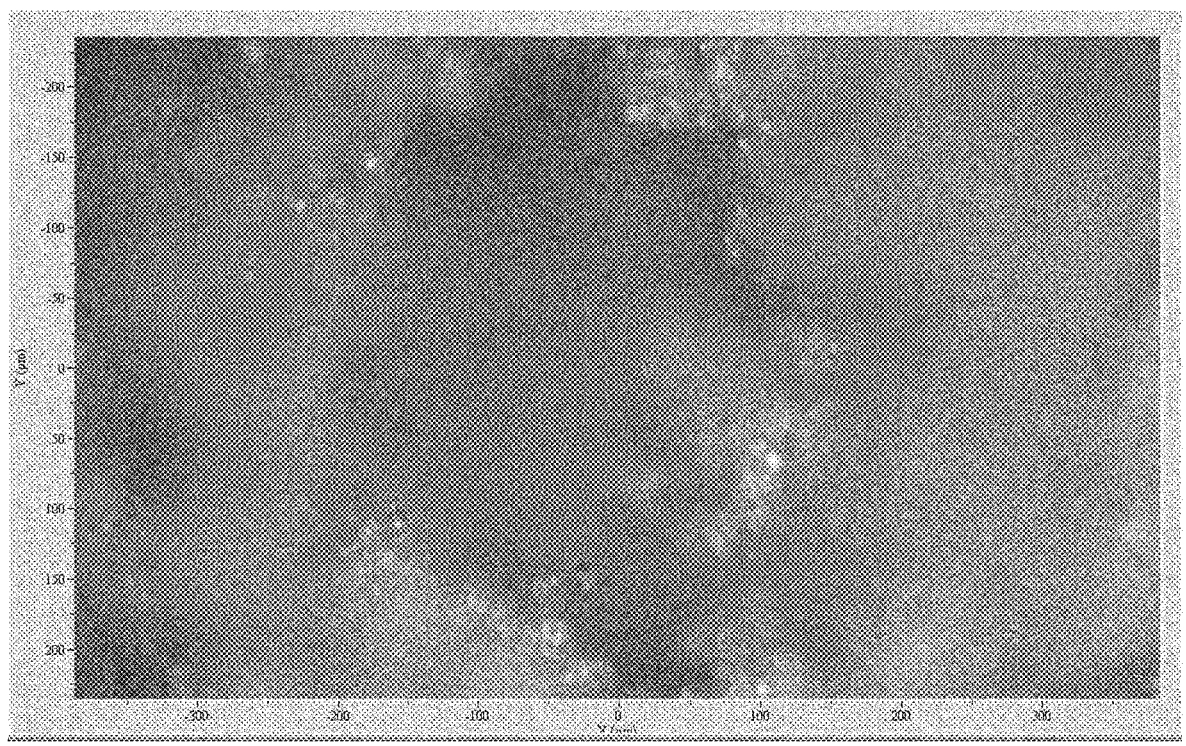
FIG. 2 is an enlarged photograph on a surface of a porous body.

When a surface of the porous body is observed with an optical microscope, as shown in FIG. 2, an open structure as if the structure has holes may be observed in some cases. The diameter of the open structure on a surface of the porous body is not particularly limited as long as a porous coordination polymer compound can be introduced into pores, and is generally 1 to 1000 μm and is 1 to 100 μm in some cases, and a case where the diameter is 5 to 20 μm is also observed. In that case, the porous body with a structure having a diameter of 700 to 1000 μm (Example 3 of the present application) or even 300 to 400 μm on average can be used. From the view point of the space filling rate or the introduction rate of the porous coordination polymer compound, the latter is more advantageous (Examples 4 and 5 of the present application). In particular, taking the ease of introduction of the porous coordination polymer compound into a porous body, the stability after formation of a composite, or the like into consideration, it is favorable that the diameter is not extremely large or not extremely small.

Pores are observed on a surface of the porous body. The average pore diameter is not particularly limited as long as a porous coordination polymer compound can be introduced inside the pores, and the opening diameter of each of the pores on a surface of the porous body is preferably equal to or larger than the particle diameter of the porous coordination polymer compound. The opening diameter is generally 1 μm or more and preferably 5 μm or more, and is usually 100 μm or less and preferably 20 μm or less. Further, the range of the average pore diameter is not particularly limited, and is 1 to 100 μm and preferably 5 to 20 μm.

In a case where the average pore diameter of the porous body is within the above-described range, it becomes easy to introduce a porous coordination polymer compound into the pores, and further, the porous coordination polymer compound introduced into the pores hardly leaks to the outside. In particular, the average pore diameter of the porous body is preferably equal to or larger than the particle diameter of the porous coordination polymer compound. The smaller the average pore diameter of the porous body is as compared with the particle diameter of the porous coordination polymer compound, the easier it is to introduce the porous coordination polymer compound into the pores. Conversely, the closer the average pore diameter of the porous body is to the particle diameter of the porous coordination polymer compound, the more difficult it is for the porous coordination polymer compound introduced once into the pores to flow to the outside.

The electron micrograph of FIG. 1 shows the state of the porous body of the present invention. Ones observed to be spherical are porous organic silica structures constituting the porous body of the present invention, and the porous body of the present invention is formed by assembling porous organic silica structures. The part where porous organic silica structures are not assembled is a pore. The present inventors, et al. do not take a specific theory on the state in which the porous coordination polymer compound is adsorbed to a porous body, however, it can be described that the central part of the porous coordination polymer compound (the photograph in the upper part of FIG. 1), which is a part where porous organic silica structures are not assembled, is a pore, and when the porous coordination polymer compound is incorporated in the pores, the porous coordination polymer compound is physically and chemically incorporated and adsorbed in the porous body.

In this regard, the values of the opening diameter and the average pore diameter in the present specification are the results obtained by the measurement with the method described in Examples to be described later, and specifically, are the values determined by specifying pore parts from an electron microscope (SEM) image of the porous body, and taking the length distribution in the major axis direction when the pore parts each are assumed to be an oval shape.

The theoretical maximum introduction rate of a PCP to the porous body is preferably 60% by mass or more, and more preferably 70% by mass or more. Further, the upper limit of the theoretical maximum introduction rate of a PCP to the porous body is not particularly limited, and is usually 99% by mass or less and 95% by mass or less. In this regard, the theoretical maximum introduction rate is a theoretical value of the maximum value of a PCP that can be introduced into pores of the porous body, and it can be expected that the larger the value is, the larger the amount of a PCP that can be introduced into the porous body is. The value of the theoretical maximum introduction rate in the present specification is the result obtained by the measurement with the method described in Examples to be described later, and specifically, is the value calculated by using the following equation.

$$V_{pore} \times \rho_{PCP} = M_{PCPMAX}$$

$$\text{Theoretical maximum introduction rate} = (M_{PCPMAX}/(M_{porous}+M_{PCPMAX})) \times 100 \quad \text{Equation}$$

(where $V_{pore}$: void volume of a porous body, $\rho_{PCP}$: bulk density of a PCP, $M_{PCPMAX}$: theoretical maximum mass of a PCP occupying void, $M_{porous}$: mass of a porous body, and further, at this time, $\rho_{PCP}$ is obtained by putting 1 g of PCP in a graduated cylinder, tapping on the PCP with a weight of 100 g to fill the graduated cylinder with the PCP, and measuring the volume.)

A porous body has voids due to the three-dimensional structure by a network, and a porous coordination polymer compound can be introduced into the inside of the porous body. The void ratio of the porous body is 50% by volume or more, preferably 70% by volume or more, and more preferably 60% by volume or more. As the void ratio of the porous body is higher, it is easier to introduce the porous coordination polymer compound in more amount into the pores. Further, the upper limit of the void ratio of the porous body is not particularly limited, and is usually 99% by volume or less and 95% by volume or less. In this regard, the void ratio means a ratio of the volume of the pores to the total volume of the porous body. Further, the value of the void ratio in the present specification is the result obtained by the measurement with the method described in Examples to be described later, and specifically, is the value calculated from the ratio obtained by taking the increased volume of a solution when the porous body is immersed in methanol (99%) as the skeletal volume of a porous body, and taking the difference from the volume of the porous body as the void volume.

The network structure of the porous body of the present invention preferably has partial structures represented by the following formulas (M1) and (M2).

[Chemical formula 9]

-continued

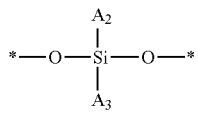
(M2)

(in the formula, $A_1$ is a functional group selected from the group consisting of a vinyl group, a cyano group, an alkyl group having 1 to 5 carbon atoms, an amino group, a mercapto group, a fluoro group, an aryl group, and an epoxy group; $A_2$ and $A_3$ are functional groups selected from the group consisting of a vinyl group, a cyano group, an alkyl group having 1 to 5 carbon atoms, an amino group, a mercapto group, a fluoro group, an aryl group, and an epoxy group, and may be the same as or different from each other; and the symbol "*" represents a chemical bond and means to bond to adjacent Si.)

The combination of the formula (M1) and the formula (M2) can be used by the appropriate and arbitrary combination within the range that the effects of the present invention are obtained. The network structure of the porous body of the present invention is characterized by having a random and flexible structure but not a lattice structure, and the adjustment of the randomness can be performed by the selection of A1, A2, and A3 taking the chemical properties, the length of substituent, the bulk height, and the like into consideration. Therefore, the sizes and properties of the openings and pores present on a surface of the porous body can be controlled. As a result, the influences on the space filling rate and on the introduction rate of the porous coordination polymer compound can be exerted.

In particular, the formula (M1) is preferably one or more kinds selected from the group consisting of the following formulas (M1-1), (M1-2), and (M1-3).

[Chemical formula 10]

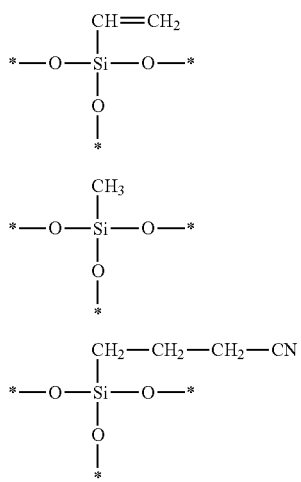

(in the formula, the symbol "*" represents a chemical bond and means to bond to adjacent Si.)

Further, the formula (M2) is preferably one or more kinds selected from the group consisting of the following formulas (M2-1), (M2-2), and (M2-3).

[Chemical formula 11]

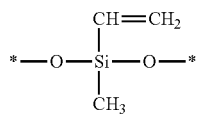
(M2-1)

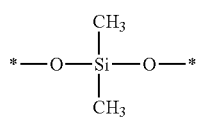
(M2-2)

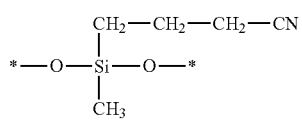
(M2-3)

(in the formula, the symbol "*" represents a chemical bond and means to bond to adjacent Si.)

The porous body of the present invention may partially have another structure as long as it has a network structure obtained by copolymerizing a dialkoxysilane and a trialkoxysilane. As such a structure, for example, a structure in which a tetraalkoxysilane having four alkoxy groups is used as a basic skeleton, or the like can be mentioned. Examples of the tetraalkoxysilane include tetramethoxysilane, and tetraethoxysilane.

The network structure obtained by copolymerizing a dialkoxysilane and a trialkoxysilane is contained in an amount of preferably 80 mol % or more, more preferably 90 mol % or more, and particularly preferably 99 mol % or more, relative to the entire porous body.

(Method for Producing Porous Body)

A porous body can be produced by copolymerizing a dialkoxysilane and a trialkoxysilane. In this regard, in the above copolymerization, a component other than the dialkoxysilane and the trialkoxysilane may be contained.

The copolymerization of a dialkoxysilane and a trialkoxysilane can be performed by a known method, and for example, the copolymerization can be performed by adding a dialkoxysilane and a trialkoxysilane to an acidic solution containing a surfactant and a hydrolyzable compound to form a sol and then aging the sol for a long period of time at high temperature to turn the sol into a gel. Hereinafter, the production method will be described in detail.

As the dialkoxysilane to be a raw material, any dialkoxysilane can be appropriately selected depending on the physical properties or the like to be required for the porous body as long as it has two alkoxy groups. Similarly, as the trialkoxysilane to be a raw material, any trialkoxysilane can be appropriately selected depending on the physical properties or the like to be required for the porous body as long as it has three alkoxy groups.

In particular, the porous body having partial structures represented by the above formulas (M1) and (M2) can be produced by copolymerizing a trialkoxysilane represented by the following formula (M3) and a dialkoxysilane represented by the following formula (M4).

[Chemical formula 12]

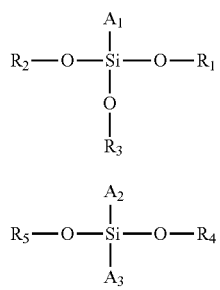

(M3)

(M4)

(in the formula, $R_1$ to $R_5$ each are an alkyl group having 1 to 5 carbon atoms and may be the same as or different from each other, and $A_1$ to $A_3$ are the same as the above.)

In particular, since the porous body to be obtained has a high void ratio and is excellent in the flexibility, as the dialkoxysilane, one or more compounds selected from the group consisting of dimethyldimethoxysilane, diethyldimethoxysilane, dimethyldiethoxysilane, vinylmethyldimethoxysilane, and vinylmethyldiethoxysilane are preferred. Further, as the trialkoxysilane to be copolymerized with the above one or more compounds, for example, one or more compounds selected from the group consisting of methyltrimethoxysilane, ethyltrimethoxysilane, methyltriethoxysilane, vinyltrimethoxysilane, vinyltriethoxysilane, and 4-(trimethoxysilyl)butane nitrile are preferred.

With respect to the dialkoxysilane and the trialkoxysilane, the compounds of each of the dialkoxysilane and the trialkoxysilane may be used singly alone, or in combination of two or more kinds thereof. For example, one kind of a dialkoxysilane and two kinds of trialkoxysilanes may be used, or two kinds of dialkoxysilanes and one kind of a trialkoxysilane may be used.

The mixing amount of a dialkoxysilane and a trialkoxysilane can be appropriately set depending on the characteristics or the like to be required for the porous body, and is generally 1:10 to 10:1 and preferably 1:5 to 5:1 in terms of a molar ratio. Further, in a case where two or more kinds of either one or both of the dialkoxysilanes and the trialkoxysilanes are used, the mixing amount is generally 1:10 to 10:1 and preferably 1:5 to 5:1 in terms of a molar ratio relative to the total amount of the dialkoxysilanes and the total amount of the trialkoxysilanes.

In addition, as described above, the porous body may partially have a structure other than the network structure obtained by copolymerizing a dialkoxysilane and a trialkoxysilane. In a case where the porous body has such another structure, for example, a tetraalkoxysilane such as tetramethoxysilane, and tetraethoxysilane may be added. The content of the tetraalkoxysilane is preferably 1% by mass or less, and more preferably 0.5% by mass or less, relative to the total weight of the whole monomers including the dialkoxysilane and the trialkoxysilane. When the content of the tetraalkoxysilane exceeds 1% by mass, synthesis of the porous body tends to be difficult.

Next, by using an acidic solution, the dialkoxysilane and the trialkoxysilane are hydrolyzed to turn the silicon compound into a sol. In this process, the alkoxy groups of the dialkoxysilane and the trialkoxysilane form a siloxane network by the hydrolysis and the polycondensation reaction, and the non-hydrolyzable functional group other than the alkoxy group is not hydrolyzed and is maintained.

As the acid of the acidic solution, carboxylic acids can be mentioned, for example, acetic acid, formic acid, propionic acid, oxalic acid, or malonic acid is preferred, and acetic acid is more preferred. The concentration of the acidic solution is not particularly limited as long as it is a concentration at which the hydrolysis reaction proceeds, and the concentration is generally 0.1 to 200 mM (mmol/l), and preferably 2 to 50 mM.

A surfactant has a function of reducing the difference in chemical affinity between a solvent and a copolymer in a reaction system, and by reducing the difference, pores of a porous body become finer. As the surfactant, a nonionic surfactant, or an ionic surfactant can be mentioned, and an ionic surfactant is preferred, and a cationic surfactant is more preferred. As the cationic surfactant, hexadecyltrimethylammonium chloride, or hexadecyltrimethylammonium bromide can be mentioned, and among them, hexadecyltrimethylammonium chloride is preferred because of having a high affinity. The amount of the surfactant is generally 0.001 to 1% by mass, and preferably 0.01 to 0.1% by mass, relative to the total mass of the acidic solution containing a dialkoxysilane, a trialkoxysilane, a surfactant, and a hydrolyzable compound.

The hydrolyzable compound has a function of promoting the gelation of a sol being formed. Examples of the hydrolyzable compound include urea, formamide, N-methylformamide, N,N-dimethylformamide, acetamide, N-methylacetamide, N,N-dimethylacetamide, and hexamethylenetetramine, and among them, urea having a high effect of promoting the gelation is preferred. The amount of the hydrolyzable compound is generally 0.01 to 10% by mass, and is preferably 0.1 to 1.0% by mass, relative to the total mass of the acidic solution containing a dialkoxysilane, a trialkoxysilane, a surfactant, and a hydrolyzable compound.

The solution temperature is not particularly limited as long as it is a temperature at which the hydrolysis reaction proceeds, and is generally 10 to 50° C., and preferably 20 to 40° C. Further, although depending on the reaction conditions, the solution time is generally 10 minutes to 5 hours, and preferably 30 minutes to 2 hours.

Gelation of the obtained sol is conducted by aging. The aging can be conducted by leaving the sol that is a reactant to stand. The gelation temperature (aging temperature) is not particularly limited as long as it is a temperature at which the sol turns into a gel, and is generally 50 to 200° C., and preferably 60 to 100° C. Further, although depending on the reaction conditions, the gelation time (aging time) is generally 1 to 50 hours, and preferably 15 to 20 hours.

Next, in order to remove the moisture, acidic solution, surfactant, hydrolyzable compound, unreacted silicon compound material and the like, which remain in the gel obtained by sol-gel reaction, it is preferred to perform solvent exchange by using an organic polar solvent. Through the processes described above, a network of a flexible gel can be constructed by the networking of Si—O bonds.

The porous body can be formed into a desired shape by putting the porous body into a mold having a specific shape, and conducting sol-gel reaction so that the porous body is molded, or by conducting sol-gel reaction as it is unmolded and then cutting the resultant product into a specific shape, or the like. As the shape of the porous body, a spherical shape, a cylindrical shape, a conical shape, a square shape, a prismatic pillar shape, a pyramid shape, or the like can be used.

2. Method for Producing Composite Material (Combining Method)

Next, the method for producing a composite material according to the present invention will be described. The composite material can be produced by preparing a porous body having a network structure of Si—O bonds obtained by copolymerizing a dialkoxysilane and a trialkoxysilane, and by carrying a porous coordination polymer compound in pores of the porous body via a solvent.

There are roughly two methods for producing a composite material. One is a method in which a PCP is synthesized in advance separately from a porous body, and the synthesized PCP is brought into contact with the porous body so as to be carried on the porous body (hereinafter, also referred to as "external synthesis method"). The other is a method in which a synthesis reaction of a PCP is performed inside the pores of a porous body, and the synthesized PCP comes into contact with the porous body and is carried on the porous body (hereinafter, also referred to as "internal synthesis method"). The production method according to the present invention includes both of the external synthesis method and the internal synthesis method.

(External Synthesis Method)

Hereinafter, the external synthesis method will be described. In the external synthesis method, at first, a porous body and a porous coordination polymer compound are separately adjusted. These can be produced by the method described in the section of "(Method for producing porous body)", and the section of "(Method for producing porous coordination polymer compound)". Note that the method for producing a composite material by the external synthesis method is a preferred method for producing the composite material according to the present invention. That is, taking the versatility and the production cost into consideration, the external synthesis method is superior to an internal synthesis method to be described later. As compared with an internal synthesis method, the external synthesis method can reduce the amount of a reagent to be used during synthesis, the loss is large, and it is easier to introduce a PCP homogeneously as compared with an internal synthesis method, and further it is advantageous in attaching the PCP to the inside of a shaping material. From these points of view, as the method for producing a composite material, the external synthesis method is preferable to the internal synthesis method.

Next, the porous coordination polymer compound is dispersed in a solvent to adjust a dispersion liquid (dispersion liquid adjustment step). As the solvent, one that does not dissolve both of the porous body and the porous coordination polymer compound is selected. In this regard, the expression "not dissolve both" means that no significant amount of both of the porous body and the porous coordination polymer compound dissolves in a solvent. As described above, structurally, both of the porous coordination polymer compound and the porous body are those formed by three-dimensionally bonding molecules, and it can also be said that the solvent is a solvent that does not break the bond due to the action of a solvent. With respect to the porous coordination polymer compound, as the solvent, there is also a meaning of not dissolving the metal ion in the porous coordination polymer compound into the solvent.

Further, as the solvent, a solvent having a property of swelling a porous body is preferred. Herein, the expression "swelling a porous body" means that a solvent acts on a porous body so that the solvent is incorporated into the porous body, and the volume is increased by changing a part or most of the intermolecular distances without changing the basic structure.

A solvent having these characteristics can be appropriately selected depending on the properties of the porous coordination polymer compound or the porous body. The solvent that can be selected may be a non-polar solvent or a polar solvent, and may also be a protic solvent, or an aprotic solvent. Further, as the kind of the solvent, either an aqueous solvent or an organic solvent may be used.

Specific examples of the solvent include water as an aqueous solvent, and as an organic solvent, an alcohol having 1 to 10 carbon atoms, an aldehyde having 1 to 5 carbon atoms, a ketone having 3 to 5 carbon atoms, and a cyclic hydrocarbon having 5 to 10 carbon atoms. More specific examples of the organic solvent include methanol, ethanol, 1-propanol, 2-propanol, 1-butanol, 2-butanol, benzene, hexane, acetaldehyde, acetone, cyclohexane, and N,N-dimethylformamide. These solvents may be used singly alone, or may be used by mixing two or more kinds thereof. Among them, methanol, ethanol, acetone, cyclohexane, and N,N-dimethylformamide are preferred from the viewpoint of the high permeability into pores of a porous body, and in particular, methanol, ethanol, and acetone are preferred.

Subsequently, the dispersion liquid adjusted in the above is brought into contact with a porous body to introduce a porous coordination polymer compound into pores (contact step). The contact step can be performed by bringing a porous body into contact with a dispersion liquid. In the contact step, it is preferred to perform the stirring lightly by using a stirrer or the like in a state that the porous body is brought into contact with the dispersion liquid. As the stirrer, a stirrer having a rotor, or the like can be mentioned. In this regard, it is not necessary to perform the stirring strongly, but rather, it is important to pay attention so that particles of a porous coordination polymer compound are not broken due to the stirring or that the porous coordination polymer compound incorporated into pores of the porous body is not discharged outside the pores. That is, it is sufficient to stir the particles of the porous coordination polymer compound to such an extent that the particles are stirred up in a solvent, and it is preferred to perform the stirring to such an extent that the porous body is not stirred up in the solvent.

In this regard, in the above-described embodiment, the contact step is performed while the porous body is immersed in a dispersion liquid in which the porous coordination polymer compound is dispersed in a solvent, but the contact step is not limited thereto. As the contact step, for example, a method in which a porous coordination polymer compound in a powder form is added to a porous body in a state that the porous body is immersed in a solvent in advance, a method in which a porous body and a porous coordination polymer compound in a powder form are mixed and then a solvent is added to the resultant mixture, or the like may also be accepted.

Further, in a case where a solvent having a property of swelling a porous body is used as the solvent, the porous body swells in the contact step. With respect to the swelling ratio at this time, when the volume of the porous body before immersion is taken as V0 and the volume after immersion is taken as V1, a volume expansion rate (V1/V0) of the porous body is preferably in a range of 1.2 to 2.0, and more preferably in a range of 1.3 to 1.7. As described above, when the porous body swells with a solvent, the porous coordination polymer compound easily enters the pores of the porous body, and the filling rate of the porous coordination polymer compound to the porous body can be increased.

(Washing and Drying Steps)

It is preferred to perform a washing step of removing a porous coordination polymer compound that has not been carried on a porous body after the porous coordination polymer compound is brought into contact with the porous body, and a drying step of drying a solvent.

The washing step is a step of removing an unreacted porous coordination polymer compound and other components. The washing step is performed by a method of washing a composite material with a washing solvent. Examples of the washing solvent include water, and an organic solvent such as ethanol or methanol. The washing may be performed only once, or may be performed multiple times.

The drying step is a step of drying the composite material after washing. The drying step can be performed in the air, in an atmosphere of inert gas, in a vacuum, or the like. The drying temperature is not particularly limited as long as it is a temperature at which the solvent in the composite material can be removed to the necessary extent, and is generally 50 to 100° C., and preferably 60 to 90° C. The drying may be performed by sending a wind with a dryer or the like, or may be performed without sending a wind.

Further, in a case where a solvent having a property of swelling a porous body is used as the solvent, the porous body is restored in the drying step. When the volume after the drying is performed after contact is taken as V2, the volume restoration rate (V2/V0) is preferably 0.3 to 0.9, and more preferably 0.5 to 0.8. As described above, when the porous body shrinks more than the original size by the drying, the composite material is compactly packed, and the porous coordination polymer compound that has entered the pores of the porous body hardly leaks to the outside.

The above-described contact (permeation) step, washing step, and drying step may be performed only once, or may be repeated multiple times. By performing these steps multiple times, the porous coordination polymer compound is incorporated into the pores of the porous body each time and the filling rate is increased. In a case where the above-described steps are repeated multiple times, the number of repetition times is not particularly limited, and is generally around 2 to 5 times, and preferably around 3 or 4 times.

(Internal Synthesis Method)

Next, the internal synthesis method will be described. In the internal synthesis method, at first, a porous body is prepared, and a porous coordination polymer compound is synthesized in pores of the porous body. The porous body can be produced by the method described in the section of "(Method for producing porous body)".

Next, a porous coordination polymer compound is synthesized in the prepared porous body. The synthesis of a porous coordination polymer compound can be performed in the same manner as in the section of "(Method for producing porous coordination polymer compound)". Specifically, the synthesis can be performed by mixing and stirring a metal ion, an organic ligand, and a solvent with the porous body. The details of the metal ion, the organic ligand, and the solvent are as described above, the reaction temperature is also around ordinary temperature to 300° C., the reaction time is around 30 minutes to 3 weeks, and the reaction pressure is around from normal pressure to 1 to 10 MPa. After the reaction, the composite material is washed and dried in a similar manner as in the above-described section of "(Washing and drying steps)" so as to complete the composite material.

(Space Filling Rate)

The composite material produced in this manner can be filled in pores of a porous body with a high space filling rate of 50% by volume or more of a porous coordination polymer compound. The space filling rate can also be set to 60% by volume. The upper limit of the space filling rate is not particularly limited, and is for example, 99% by volume or less, and 95% by volume or less. In this regard, the space filling rate in the present specification is the result obtained by the measurement with the method described in Examples to be described later, and specifically, is the value obtained by measuring the mass change before and after introduction of the porous coordination polymer compound into the porous body, and calculating from the ratio of the PCP volume determined from the mass change and the bulk density of the porous coordination polymer compound, and the void volume of the porous body.

(Complex Introduction Rate: PCP Introduction Rate)

Further, the composite material can be introduced with a high complex introduction rate of 40% by mass or more, the complex introduction rate (that is, PCP introduction rate) is indicated by a mass of the porous coordination polymer compound to the total mass of the composite material. The PCP introduction rate can also be set to 50% by mass. The upper limit of the complex introduction rate is not particularly limited, and is for example, 99% by mass or less, and 95% by mass or less. In this regard, the PCP introduction rate in the present specification is the result obtained by the measurement with the method described in Examples to be described later, and specifically, is the value obtained by measuring the mass change before and after introduction of the porous coordination polymer compound into the porous body, and calculating from the ratio of the mass change and the total mass after introduction.

As described above, the porous body of the present invention, which is obtained by copolymerizing a dialkoxysilane and a trialkoxysilane, can carry a porous coordination polymer compound at a filling rate higher than that of a conventional silica monolith of a tetraalkoxysilane. This mechanism is speculated as follows.

In the conventional silica monolith of a tetraalkoxysilane, since silicon of a monomer has four hydrolyzable functional groups, all of the four bonds of silicon are Si—O bonds in the polymer, the bonds are dense, and the polymer becomes hard as a carrier. For this reason, clogging is easily generated in pores when filling a porous coordination polymer compound that is plate-like particles having a high aspect ratio, and further, it is difficult to swell the silica monolith to temporarily widen the pores and to easily introduce the porous coordination polymer compound to the inside of the pores.

On the other hand, in the porous body of the present invention, there are two or three functional groups (hydrolyzable functional groups) that form Si—O bonds of an alkoxysilane monomer, and the copolymer has a functional group (non-hydrolyzable functional group) that is not involved in the Si—O bond. For this reason, the porous body has a coarse bond, and therefore has a nature that is rich in flexibility. Accordingly, as described later, the pores of the porous body have a structure in which spherical particles are connected, and have small voids between the particles and large voids made of a connected chain structure. Accordingly, as compared with the conventional silica monolith of a tetraalkoxysilane, in the porous body of the present invention, the porous coordination polymer compound is easily filled in the pores of the porous body, and the porous body is hardly clogged, and further, the porous coordination polymer compound is easily incorporated into the pores by swelling the porous body by using a solvent or the like. In particular, in the present invention, two kinds of monomers having different properties, which is a dialkoxysilane and a trialkoxysilane, are copolymerized, and therefore, the network structure of Si—O bonds is more flexible as compared with that of a homopolymer obtained by polymerizing only any one of the kinds.

In addition, the porous body of the present invention has a functional group that is not involved in the Si—O bond, and therefore, by appropriately selecting the functional group, there is also an advantage that a porous body having various characteristics can be obtained as compared with those of the conventional silica monolith.

(Volume Ratio Before and after Combination)

The ratio of a volume of the composite material to a volume of the porous body before combination is preferably 1.0 or less. As described above, when the volume after the combination is smaller than that before the combination, the composite material is compactly packed, and the porous coordination polymer compound that has entered the pores of the porous body hardly leaks to the outside. The above-described volume ratio is preferably 0.3 to 0.9, and more preferably 0.5 to 0.8.

(Performance of Porous Coordination Polymer Compound after Combination)

With respect to the composite material according to the present invention, by combining a porous body obtained by copolymerizing a dialkoxysilane and a trialkoxysilane, and a porous coordination polymer compound, the porous coordination polymer compound can be carried on the porous body in a state that the properties of the porous coordination polymer compound are maintained or improved. That is, with respect to the composite material according to the present invention, the porous coordination polymer compound can be carried on the porous body without deteriorating the properties of the porous coordination polymer compound as compared with the porous coordination polymer compound before the combination.

In this regard, as the properties of the porous coordination polymer compound, for example, gas adsorption performance and the like can be mentioned, and specifically, adsorption performance of carbon monoxide, and the like. In this case, the gas adsorption performance of the composite material after the combination has gas adsorption performance that is equivalent to or higher than the gas adsorption performance of the porous coordination polymer compound alone before the combination. The gas adsorption performance can be evaluated by the amount of gas adsorption, the adsorption pressure, and the rate of pressure change. It can be said that as the amount of gas adsorption is larger, as the adsorption pressure is lower, and as the rate of pressure change is larger, the gas adsorption characteristic is more excellent. All of these gas adsorption characteristics of the composite material according to the present invention are equivalent to those of the porous coordination polymer compound alone, or at least one of the gas adsorption characteristics of the composite material according to the present invention is superior to that of the porous coordination polymer compound alone. In addition, the gas adsorption characteristics can be evaluated by gas adsorption/desorption isotherm measurement.

3. Gas Adsorbent

The composite material according to the present invention can be used for various applications depending on the properties of a PCP, and in particular, can be suitably used as a part or the whole of a gas adsorbent as described above. Examples of the gas adsorbed by the gas adsorbent include carbon monoxide gas, carbon dioxide gas, nitrogen gas, and hydrogen gas, and in particular, carbon monoxide gas is preferred. Such a carbon monoxide gas is contained as a mixed gas of hydrogen, methane, nitrogen, and carbon monoxide gas, for example, in a reformed gas such as by-product gas and petroleum natural gas at a steelworks or in petrochemicals, partial oxidation gas, a reformed gas of coal tar sand or the like, a methanol decomposition gas, or the like, and the gas adsorbent according to the present invention is suitable for application of selectively adsorbing only carbon monoxide gas from such a mixed gas by, for example, a pressure swing adsorption method or the like.

Examples

Hereinafter, the present invention will be described specifically by way of Examples, however, the object of the present invention is not limited to the following Examples. Further, in the following Examples, the expression "%" is on a mass basis (mass percent) unless otherwise particularly specified.

1. Physical Property Evaluation Method
(1) With Respect to Porous Body
(a) Average Pore Diameter The average pore diameter of a porous body was determined by SEM observation. The average pore diameter was determined by assuming a pore part of the obtained SEM image to be an oval shape, and taking a length distribution in the major axis direction.

(b) Void Ratio

The void ratio of a porous body was calculated by an Archimedes method. The void ratio was calculated from the ratio obtained by taking the increased volume of a solution when the porous body was immersed in methanol (99%) as the skeletal volume of a porous body, and taking the difference from the volume of the porous body as the void volume.

(c) Theoretical Maximum Introduction Rate

The theoretical maximum introduction rate of a porous body was calculated by using the following equation.

$$V_{pore} \times \rho_{PCP} = M_{PCPMAX}$$

$$\text{Theoretical maximum introduction rate} = (M_{PCPMAX}/(M_{porous}+M_{PCPMAX})) \times 100 \quad \text{Equation}$$

(where $V_{pore}$: void volume of a porous body, $\rho_{PCP}$: bulk density of a PCP, $M_{PCPMAX}$: theoretical maximum mass of a PCP occupying void, $M_{porous}$: mass of a porous body, and further, at this time, $\rho_{PCP}$ was obtained by putting 1 g of PCP in a graduated cylinder, tapping on the PCP with a weight of 100 g to fill the graduated cylinder with the PCP, and measuring the volume.)

(2) With Respect to Composite Material
(a) Space Filling Rate

The space filling rate of a composite material was obtained by measuring the mass change before and after introduction of a PCP, and calculating from the ratio of a PCP volume determined from the mass change and the bulk density of the PCP, and a void volume of a porous body.

(b) PCP Introduction Rate

The PCP introduction rate of a composite material was obtained by measuring the mass change before and after introduction of a PCP, and calculating from the ratio of the mass change and the total mass after introduction. In this regard, depending on the measurement method of bulk density, the degree of packing of a PCP in a porous body may exceed 100% because there is also a PCP being partially immobilized on the outer surface of the porous body.

2. Example 1

(1) Synthesis of Porous Body

A porous body was synthesized according to the scheme of the following chemical formula. Specifically, at first, 5.0 g of urea and 1.0 g of hexadecyltrimethylammonium chloride (CTAC) were dissolved in 15 ml of a 5 mM acetic acid aqueous solution, 25 mmol of vinyltrimethoxysilane (VTMS) and 10 mmol of vinylmethyldimethoxysilane (VMDMS) were added into the above-obtained mixture, and the resultant mixture was stirred at room temperature for 60 minutes to cause a sol reaction. After completion of the reaction, the obtained mixture was left to stand at 353 K for 9 hours and aged to cause a gel reaction. The obtained gel was washed with methanol, and the resultant gel was dried at 353 K for 1 hour in the air to obtain a porous body. When physical properties of the obtained porous body were measured by the above-described physical property measurement method, the average pore diameter was 13.8 μm, the void ratio was 84.5% by volume, and the theoretical maximum introduction rate of the following PCP-1 was 74.8% by mass.

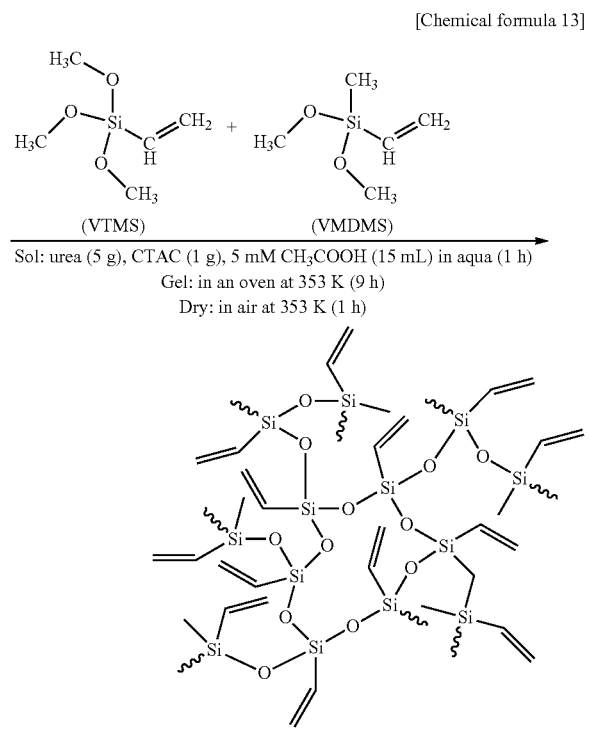

[Chemical formula 13]

(2) Synthesis of Porous Coordination Polymer Compound (PCP-1)

The PCP-1 was synthesized by a solution method. One mmol of copper nitrate trihydrate and 1 mmol of 5-heptafluoropropyl isophthalic acid were dissolved in a mixed solvent of 15 ml of methanol and 5 ml of ion exchanged water, 81 μl of pyridine was added into the obtained mixture while stirring, and then the resultant mixture was stirred at 353K for 12 hours. The solution after the reaction was filtered, the obtained product was washed with methanol, and the resultant product was dried at 353 K for 3 hours in the air to obtain a PCP-1. The yield was 26.6%, the average particle diameter was 3.7 μm, and the thickness was 0.8 μm.

(3) Preparation of Composite Material

The above-obtained PCP-1 in an amount of 120 mg was mixed with 1 mL of methanol to adjust a suspension. A cylindrical porous body (90 mg) was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-1 was carried on the porous body. When physical properties of the obtained composite material were measured by a physical property measurement method, the space filling rate was 112.8% by volume, and the PCP introduction rate was 77% by mass.

(4) Electron Micrographs of Porous Body and Composite Material

By using the obtained porous body and composite material, a sample for measurement was prepared by placing a small amount of a composite sample on a carbon paste, and then subjecting the composite sample to platinum vapor deposition, as, SEM photographs were taken by using a scanning electron microscope (FE-SEM SU8010 manufactured by Hitachi High-Technologies Corporation). The results are shown in FIG. 1. The upper part of FIG. 1 shows a photograph of the porous body before combination, and the lower part of FIG. 1 shows a photograph of the composite material after combination. As can be understood from these photographs, the porous body of the present invention has a structure in which spherical particles are connected botryoidally in a chain state, and has a structure in which large voids exist from the surface to the inside of the porous body between the chains. Further, it can be understood that the PCP-1 that is in a state of plate-like particles is carried on the inner surface of the void in the porous body (that is, particulate concave-convex part), and is highly filled also in the pores in the porous body.

(5) Evaluation for Gas Adsorption Performance of Composite Material

Figure 3:
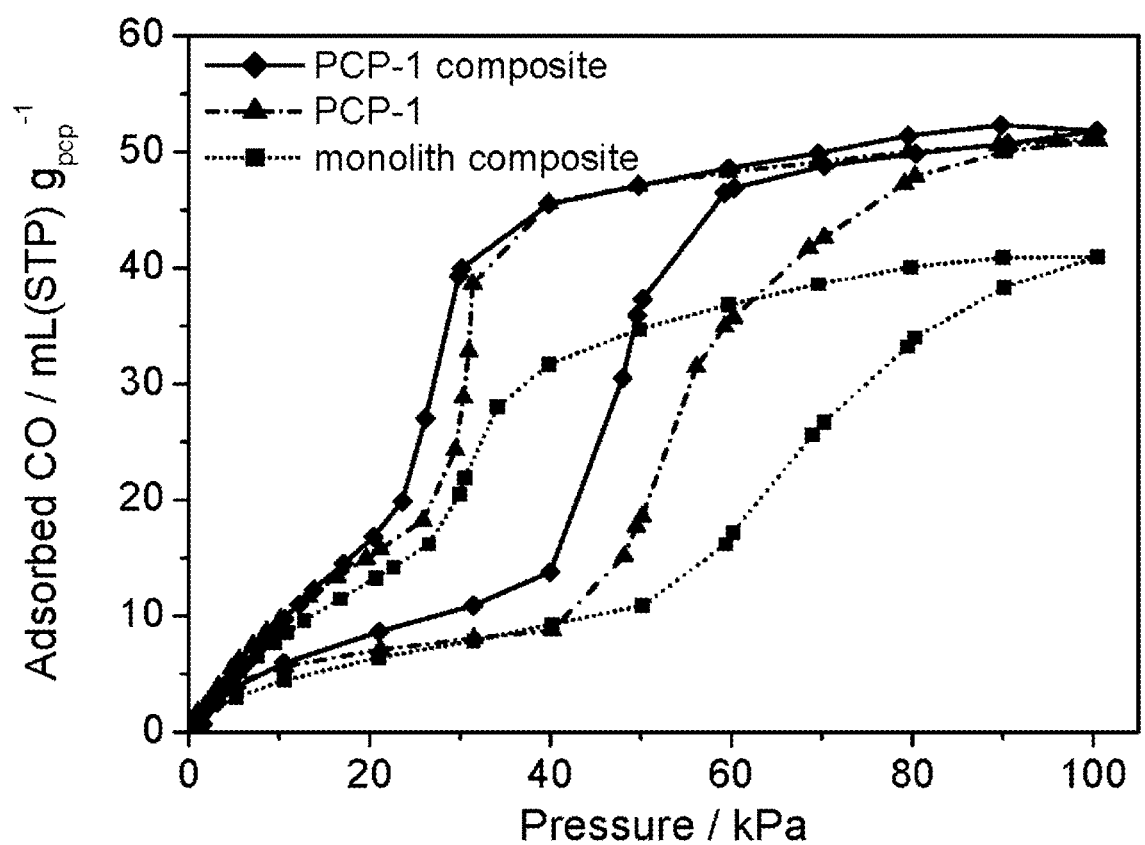
FIG. 3 is a graph showing results of the CO adsorption/desorption isotherm measurement conducted by using composite materials of Examples.

By using the obtained composite material, the adsorption activity of carbon monoxide was measured. Specifically, the measurement was performed by CO adsorption/desorption isotherm measurement at 265 K. The results are shown in FIG. 3 (solid line: PCP-1 composite).

3. Comparative Example 1

(1) Synthesis of Silica Monolith

A silica monolith was obtained by a sol-gel method accompanied by phase separation. Specifically, at first, 46.3 ml of ion exchanged water and 3.24 ml of 69% by mass nitric acid were stirred at 273 K for 15 minutes. Into the obtained mixture, while stirring, 4.79 g of polyethylene glycol (molecular weight: 35000) was added, and the resultant mixture was stirred at 273 K for 1 hour. Further, into the obtained mixture, while stirring, 37.7 g of tetraethoxysilane was added, and the resultant mixture was stirred at 273 K for 1 hour. The obtained mixture was left to stand at 313 K for 3 days and aged to be turned into a gel. The produced gel was washed with ion exchanged water and methanol, and then the resultant gel was dried at 353 K for 12 hours to obtain a silica monolith. When physical properties of the obtained silica monolith were measured by the above-described physical property measurement method, the average pore diameter was 5 μm, the void ratio was 43.0% by volume, and the theoretical maximum introduction rate of the following PCP-2 was 36.4% by mass.

(2) Preparation of Composite Material

By using the silica monolith obtained above, a composite material was obtained by an internal synthesis method. A solution obtained by dissolving 500 mg of copper nitrate trihydrate in 2 ml of ethanol was added to 90 mg of silica monolith, the obtained mixture was left to stand at 373 K for 1 hour, and then the solution was removed from the resultant mixture, and the obtained product was vacuum dried at 373 K for 1 hour to obtain a copper nitrate-containing silica monolith. After that, into the obtained copper nitrate-containing silica monolith, a solution obtained by dissolving 150 mg of 5-heptafluoropropyl isophthalic acid in 2 ml of methanol, 0.8 ml of ion exchanged water, and 8 μl of pyridine was added, and the obtained mixture was left to stand at 348 K for 12 hours to synthesize the PCP inside pores. The monolith after the reaction was washed with methanol, and then the resultant product was vacuum dried at ordinary temperature for 3 hours to obtain a composite material. When physical properties of the obtained composite material were measured by a physical property measurement method, the space filling rate was 43.7% by volume, and the amount of the introduced PCP was 20.0% by mass.

(3) Evaluation for Gas Adsorption Performance of Composite Material

By using the obtained composite material, the adsorption activity of carbon monoxide was measured in the same manner as in Example 1. The results are shown in FIG. 3 (dotted line: monolith composite).

4. Reference Example 1

(1) Evaluation for gas adsorption performance of PCP-1 alone

By using the PCP-1 obtained in Example 1, the adsorption activity of carbon monoxide was measured in a similar manner as in Example 1. The results are shown in FIG. 3 (dashed line: PCP-1).

From the results of measurement of physical properties in Example 1 and Comparative Example 1, it was found that the composite material obtained by using the porous body of Example 1 is superior both in the space filling rate of PCP-1 and the introduction rate of PCP, as compared with the case of using the silica monolith of Comparative Example 1. According to this, it was found that by using a porous body as a shaping material, the PCP-1 was able to be filled in high density.

In addition, from the results of the hysteresis curve of FIG. 3, when compared the porous body (Example 1) with the silica monolith (Comparative Example 1), it was found that by using the porous body as a shaping material, the absolute value of the adsorption amount of carbon monoxide per unit mass of the introduced PCP was larger, the pressure at the time of adsorption and desorption was on the lower pressure side, and further the pressure change (inclination of the curve) at the time of adsorption and desorption was sharper, as compared with those of the silica monolith. That is, it was found that the porous body is superior to the silica monolith in the adsorption and desorption characteristics.

Further, it was found that when compared the porous body (Example 1) with the PCP-1 alone (Reference Example 1), by combining the porous body with the PCP-1, carbon monoxide was adsorbed and desorbed on the lower pressure side as compared with that of the PCP-1 alone. According to this, it is considered that by a synergistic effect of both of the porous body and the PCP-1 due to the combination of the porous body and the PCP-1, the carbon monoxide was able to be adsorbed and desorbed on the lower pressure side as compared with that of the PCP-1 alone, and the adsorption and desorption characteristics were improved.

With respect to the synergistic effect, it is considered that by immobilizing the PCP-1 in pores of the porous body, the structural change of PCP during CO adsorption was adequately limited, and the gate became in a state suitable for CO adsorption, and therefore, excellent adsorption characteristics were exhibited. Alternatively, it is considered that when the PCP-1 was introduced into pores of the porous body, the PCP having a particle size excellent for the adsorption of CO was selectively incorporated, and therefore, excellent adsorption characteristics were exhibited.

5. Example 2

(1) Synthesis of Porous Coordination Polymer Compound (PCP-2)

A PCP-2 was synthesized by a solution method. Specifically, 6 g of copper nitrate trihydrate and 3 g of 1,3,5-benzenetricarboxylic acid were dissolved in 100 ml of ethanol, and the obtained mixture was stirred at 353 K for 12 hours. The precipitated precipitate was collected by centrifugation, and the collected precipitate was washed with ethanol three times. After that, the resultant precipitate was dried at 353 K for 4 hours in the air to obtain a PCP-2.

(2) Preparation of Composite Material

The above-obtained PCP-2 in an amount of 120 mg was mixed with 1 ml of methanol to prepare a suspension. In addition, separately, the porous body of Example 1 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-2 was carried on the porous body. When physical properties of the obtained composite material were measured by a physical property measurement method, the space filling rate was 109% by volume, and the PCP introduction rate was 83.4% by mass.

(3) Evaluation of Volume Expansion Rate and Volume Restoration Rate Using Suspension In the process of the above-described section of "(2) Preparation of composite material", the volume expansion rate of the suspension containing PCP-2 and a porous body, and the volume restoration rate after drying were measured. With respect to the cylindrical porous body, the diameter (d=2R) of a circle on the end face was 1.40 cm, the height (h) was 1.0 cm, and the initial volume (V0) calculated from the radius "R" and the height "h" was 1.54 cm$^3$. Next, the volume of the composite material after immersion in the suspension was measured. The diameter (d=2R) of the circle was 1.55 cm, the height (h) was 1.1 cm, the volume (V1) after expansion was 2.08 cm$^3$, and the volume expansion rate (V1/V0) was 1.35 times. In the end, the volume of the composite material after drying was measured. The diameter (d=2R) of the circle was 1.20 cm, the height (h) was 0.8 cm, the volume (V2) after drying was 0.91 cm$^3$, and the volume restoration rate (V2/V0) was 0.59 times.

(4) Evaluation of Volume Expansion Rate and Volume Restoration Rate Using Organic Solvent (Reference Example 2)

By using a solvent of only 99% methanol to which the PCP-2 had not been added, the volume expansion rate and the volume restoration rate were evaluated by the procedures in a similar manner as in the above-described section of "(3) Evaluation of volume expansion rate and volume restoration rate using suspension". As a result, the initial volume (V0) was 1.33 cm$^3$, the volume (V1) after expansion after immersion in the solvent was 1.82 cm$^3$, the volume expansion rate (V1/V0) was 1.37 times, the volume (V2) after drying was 1.33 cm$^3$, and the volume restoration rate (V2/V0) was 1.00 time.

When compared the volume expansion rate and volume restoration rate of Example 2 with those of Reference Example 2, the volume expansion rates in both of Example 2 and Reference Example 2 were around 1.3 times and approximately equal to each other, and the volume restoration rate was around 0.6 in Example 2 and 1 time in Reference Example 2. That is, it is considered that by adding a PCP to an organic solvent, the volume was reduced due to the interaction between the PCP and a porous body. As described above, it is considered that when a porous body was immersed in a suspension containing an organic solvent, the porous body was swelled and the PCP easily entered the inside of the porous body, and when the composite material after the immersion was dried, the volume was reduced as compared with the initial volume of the porous body due to the interaction between the PCP and the porous body, and the PCP inside the porous body was hardly flowed to the outside.

(5) Evaluation for Gas Adsorption Performance of Composite Material

Figure 4:
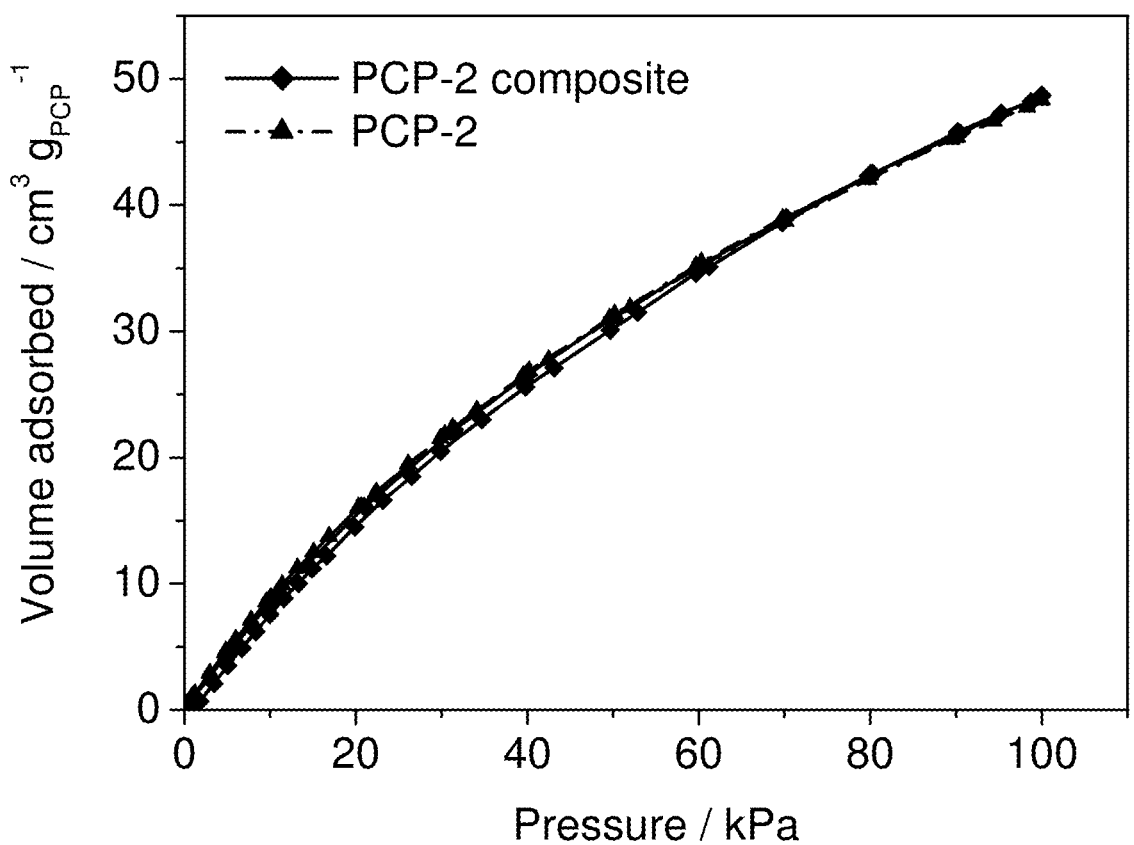
FIG. 4 is a graph showing results of the CO adsorption/desorption isotherm measurement conducted by using composite materials of Examples.

By using the composite material obtained in Example 2, the adsorption activity of carbon monoxide was measured in a similar manner as in Example 1. The results are shown in FIG. 4 (solid line: PCP-2 composite).

(6) Evaluation for Gas Adsorption Performance of PCP-2 Alone (Reference Example 3)

By using the PCP-2 obtained in Example 2, the adsorption activity of carbon monoxide was measured in a similar manner as in Example 1. The results are shown in FIG. 4 (dashed line: PCP-2).

From the results of measurement of adsorption activity of Example 2 and Reference Example 3, it was found that the composite material of Example 2 exhibited the adsorption activity of carbon monoxide that was equivalent to that of Reference Example 3. The results support the present invention in which a PCP can be carried in a state that the properties of the PCP are maintained or improved.

6. Example 3

(1) Synthesis of Porous Body

By using dimethyldimethoxysilane (DMDMS) and 4-(trimethoxysilyl)butane nitrile, a porous body was obtained by a sol-gel method accompanied by phase separation. Specifically, 5.0 g of urea and 1.0 g of hexadecyltrimethylammonium chloride (CTAC) were dissolved in 15 ml of a 5 mM acetic acid aqueous solution, 0.21 mol of 4-(trimethoxysilyl)butane nitrile and 0.14 mol of dimethyldimethoxysilane (DMDMS) were added into the above-obtained mixture, and the resultant mixture was stirred at room temperature for 60 minutes to cause a sol reaction. After completion of the reaction, the obtained mixture was left to stand at 353 K for 9 hours and aged to cause a gel reaction. The obtained gel was washed with methanol, and the resultant gel was dried at 353 K for 1 hour in the air to obtain a porous body. When physical properties of the obtained porous body were measured by the above-described physical property measurement method, the void ratio was 71.7% by volume.

(2) Preparation of Composite Material

By using the porous body obtained above and a PCP, a composite material was obtained by an external synthesis method. Specifically, at first, PCP-3 (K15037 manufactured by Nippon Steel & Sumitomo Metal Corporation) was obtained. The PCP-3 is a porous coordination polymer compound having a structure equivalent to that of PCP-1, and has an average particle diameter of 26 μm and a thickness of 5.9 μm. Next, the PCP-3 (120 mg) was mixed with 1 ml of methanol to prepare a suspension. In addition, separately, the porous body of Example 3 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-3 was carried on the porous body. When physical properties of the obtained composite material were measured by a physical property measurement method, the space filling rate was 65.3% by volume, and the PCP introduction rate was 69.2% by mass.

7. Example 4

(1) Synthesis of Porous Body

By using dimethyldimethoxysilane (DMDMS), vinyltrimethoxysilane (VTMS), and 4-(trimethoxysilyl)butane nitrile, a porous body was obtained by a sol-gel method accompanied by phase separation. Specifically, 5.0 g of urea and 1.0 g of hexadecyltrimethylammonium chloride (CTAC) were dissolved in 15 ml of a 5 mM acetic acid aqueous solution, 0.126 mol of 4-(trimethoxysilyl)butane nitrile, 0.084 mol of vinyltrimethoxysilane (VTMS), and 0.14 mol of dimethyldimethoxysilane (DMDMS) were added into the above-obtained mixture, and the resultant mixture was stirred at room temperature for 60 minutes to cause a sol reaction. After completion of the reaction, the obtained mixture was left to stand at 353 K for 9 hours and aged to cause a gel reaction. The obtained gel was washed with methanol, and the resultant gel was dried at 353 K for 1 hour in the air to obtain a porous body. When physical properties of the obtained porous body were measured by the above-described physical property measurement method, the void ratio was 86.5% by volume.

(2) Preparation of Composite Material

By using the porous body obtained above and a PCP-3 of Example 3, a composite material was obtained by an external synthesis method. Specifically, the PCP-3 (120 mg) was mixed with 1 ml of methanol to prepare a suspension. In addition, separately, the porous body of Example 4 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air to obtain a composite material in which the PCP-3 had been carried on the porous body. When physical properties of the obtained composite material were measured by a physical property measurement method, the space filling rate was 85.5% by volume, and the PCP introduction rate was 80.1% by mass.

8. Example 5

(1) Synthesis of Porous Body

By using dimethyldimethoxysilane (DMDMS), methyltrimethoxysilane, and 4-(trimethoxysilyl)butane nitrile, a porous body was obtained by a sol-gel method accompanied by phase separation. Specifically, 5.0 g of urea and 1.0 g of hexadecyltrimethylammonium chloride (CTAC) were dissolved in 15 ml of a 5 mM acetic acid aqueous solution, 0.126 mol of 4-(trimethoxysilyl)butane nitrile, 0.084 mol of methyltrimethoxysilane (MTMS), and 0.14 mol of dimethyldimethoxysilane (DMDMS) were added into the above-obtained mixture, and the resultant mixture was stirred at room temperature for 60 minutes to cause a sol reaction. After completion of the reaction, the obtained mixture was left to stand at 353 K for 9 hours and aged to cause a gel reaction. The obtained gel was washed with methanol, and the resultant gel was dried at 353 K for 1 hour in the air to obtain a porous body. When physical properties of the obtained porous body were measured by the above-described physical property measurement method, the void ratio was 84.5% by volume.

(2) Preparation of Composite Material

By using the porous body obtained above and a PCP-3 of Example 3, a composite material was obtained by an immersion method. Specifically, the PCP-3 (120 mg) was mixed with 1 ml of methanol to prepare a suspension. In addition, separately, the porous body of Example 5 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-3 was carried on the porous body. When physical properties of the obtained composite material were measured by a physical property measurement method, the space filling rate was 74.8% by volume, and the PCP introduction rate was 75.8% by mass.

9. Evaluation of Composite Materials of Examples 3 to 5

When compared the composite materials of Examples 3 to 5 with one another, the composite material of Example 3 had a large pore diameter and therefore, easily discharged the PCP, but in contrast, the composite materials of Examples 4 and 5 each had a relatively small pore diameter and therefore, favorably carried the PCP.

On a surface of the porous body of Example 3, opening parts of 700 to 1000 μm were observed, and opening parts of 300 to 400 μm were observed on a surface of each of the porous bodies of Examples 4 and 5.

10. Concentration Change of PCP

The PCP-2 (200 mg) obtained in Example 2 was mixed with 3 ml of methanol to prepare a suspension. In addition, separately, the porous body of Example 1 was cut to a piece with a cylindrical shape having a diameter of 1.4 cm and a height of 1.2 cm to prepare a sample (210 mg). The sample of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air to obtain a composite material in which 12% by mass of the PCP-2 had been carried on the porous body. These permeation, washing and drying operations were repeated two more times to obtain a composite material in which 32% by mass of the PCP-2 had been carried on the porous body, and further repeated two more times (5 times in total) to obtain a composite material in which 50% by mass of the PCP-2 had been carried on the porous body.

Figure 5:
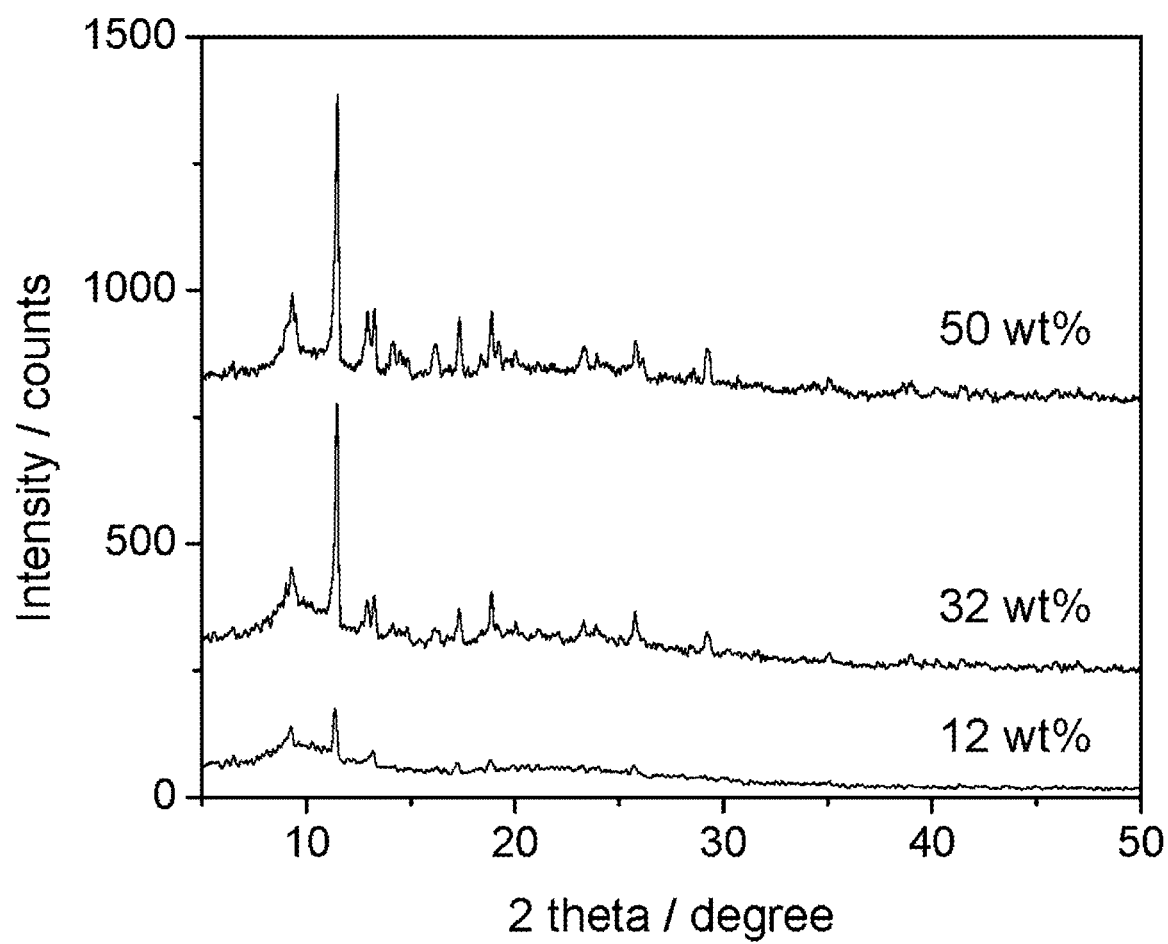
FIG. 5 is a graph showing results of X-ray diffraction of composite materials of Examples.

In addition, XRD patterns were obtained by performing X-ray diffraction on each of the above-obtained three kinds of composite materials having different concentrations from one another. The results are shown in FIG. 5. From FIG. 5, since peaks derived from a PCP were exhibited at the same position (2θ=12.5) at any concentration, it was confirmed that the PCP was introduced into the porous body.

11. Load Characteristics Evaluation

Figure 6:
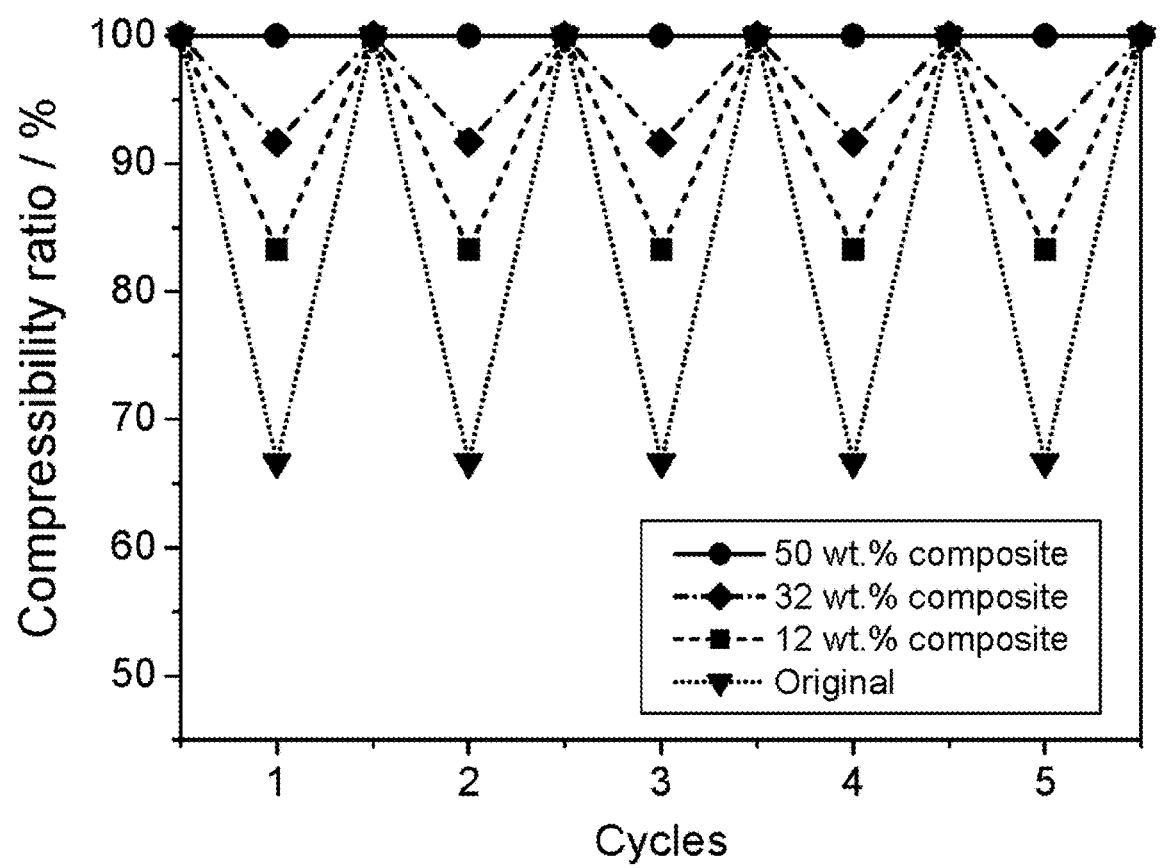
FIG. 6 is a graph showing results of the load characteristics evaluation conducted by using composite materials of Examples.

By using the composite material obtained above, a weight with 97.4 g was placed on a cylindrical body to compress the composite material, and then the weight was removed to restore the composite material. This cycle was repeated 5 times. The compressibility ratios at that time were plotted in a graph. The results are shown in FIG. 6. Note that in FIG. 6, the results of the compressibility ratios of only the porous body of Example 1 were also shown ("Original" in FIG. 6). From the results in FIG. 6, it was found that there was almost no change in compressibility characteristics even when the load was applied and repeated the cycle 5 times. In addition, as the amount of the PCP introduced into a flexible porous body is increased, the compressive elasticity is decreased, and the composite material can be hardened. The composite material according to the present invention can be used of course for applications requiring flexibility, and it can be utilized for various applications by adjusting the hardness by changing the amount of the PCP to be introduced.

12. Example 6 (Internal Synthesis Method)

By using the porous body synthesized in Example 1, a PCP-1 was synthesized by an internal synthesis method. Specifically, a solution obtained by dissolving 500 mg of copper nitrate trihydrate in 2 ml of ethanol was added to 274.3 mg of a porous body, the obtained mixture was left to stand at 373 K for 1 hour, and then the solution was removed, and the resultant product was dried for 1 hour by using a drier to obtain a copper nitrate-containing porous body. After that, into the obtained copper nitrate-containing porous body, a solution obtained by dissolving 150 mg of 5-heptafluoropropyl isophthalic acid in 2 ml of methanol was added, and the resultant mixture was left to stand at 348 K for 6 hours to synthesize a PCP-1 inside pores. The monolith after the reaction was washed with methanol, and then the resultant product was dried at ordinary temperature to obtain a composite material. When measured the yield of the PCP-1, the yield was 7.9%. In addition, when physical properties of the obtained composite material were measured by the above-described physical property measurement method, the space filling rate was 41.4% by volume, and the PCP introduction rate was 60% by mass.

13. Example 7

(1) Synthesis of PCP-4 ((Co(MeIM)$_2$ (in this Regard, MeIM is 2-Methylimidazole))

A PCP-4 was synthesized by a solution method. In 20 ml of ion exchanged water, 0.45 g of cobalt nitrate hexahydrate and 5.5 g of 2-methylimidazole were dissolved, and the obtained mixture was stirred at room temperature for 6 hours. The precipitated precipitate was collected by centrifugation, and the collected precipitate was washed with ethanol three times. After that, the resultant precipitate was dried at 353 K for 12 hours in the air to obtain a PCP-4.

(2) Preparation of Composite Material

By using the porous body of Example 1 and the PCP-4 obtained above, a composite material was obtained by an external synthesis method. The PCP-4 (120 mg) was mixed with 1 ml of methanol to prepare a suspension. In addition, separately, the porous body of Example 1 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-4 was carried on the porous body. When physical properties of the obtained composite material were measured by a physical property measurement method, the space filling rate was 114.6% by volume, and the PCP introduction rate was 64.6% by mass.

(3) Preparation of Composite Material (Case of Irradiation with Ultrasonic Waves: Example 7-2)

By using the porous body of Example 1 and the PCP-4 obtained above, a composite material was obtained by an external synthesis method. PCP-4 (50 mg) was mixed with 2 ml of methanol, and then the obtained mixture was irradiated with ultrasonic waves for 30 seconds to prepare a suspension. In addition, separately, the porous body of Example 1 was cut to a piece with a cylindrical shape to prepare a sample. The sample (52 mg) of the porous body was immersed in the obtained suspension, and the suspension was allowed to permeate a gel for one minute. After that, the gel was taken out from the suspension, and the obtained gel was dried at 353 K for 1 hour in the air. The above-described permeation and drying operations were repeated again. Into the suspension, the PCP-4 (20 mg) and 1 ml of methanol were added, the obtained mixture was irradiated with ultrasonic waves for 30 seconds, and then the above-described permeation operation was performed again, and the resultant product was dried at 353 K for 4 hours in the air to obtain a composite material in which the PCP-4 had been carried on the porous body. When physical properties of the obtained composite material were measured by a physical property measurement method, the space filling rate was 60.0% by volume, the PCP introduction rate was 60.0% by mass, and the volume restoration rate was 0.759.

(4) Evaluation for Gas Adsorption Performance of Composite Material

Figure 7:
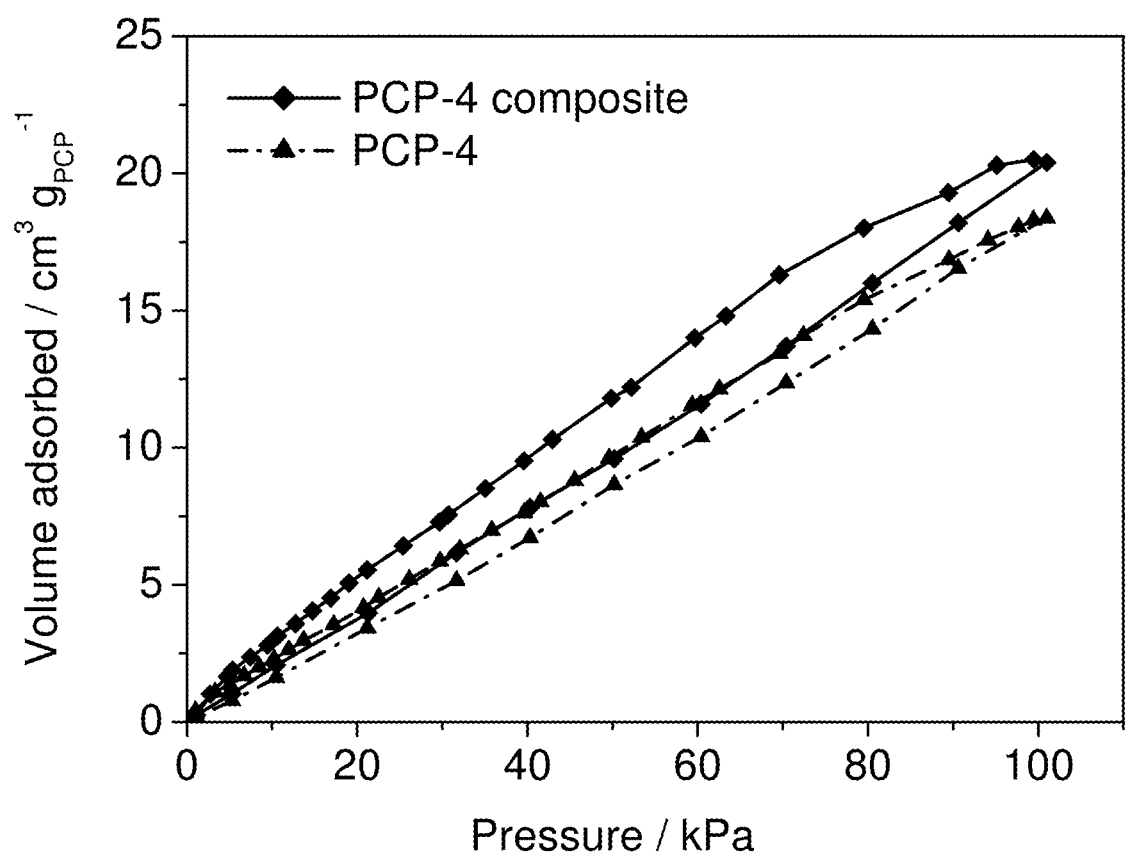
FIG. 7 is a graph showing results of the $CO_2$ adsorption/desorption isotherm measurement conducted by using composite materials of Examples.

By using the composite material obtained in Example 7-2, the adsorption activity of carbon dioxide was measured. Specifically, the measurement was performed by $CO_2$ adsorption/desorption isotherm measurement at 298 K. The results are shown in FIG. 7 (solid line: PCP-4 composite).

(5) Evaluation for Gas Adsorption Performance of PCP-4 Alone (Reference Example 4)

By using the PCP-4 obtained in Example 7, the adsorption activity of carbon dioxide was measured in a similar manner as in Example 7. The results are shown in FIG. 7 (dashed line: PCP-4).

From the results of measurement of adsorption activity of Example 7 and Reference Example 4, it was found that the composite material of Example 7 exhibited the adsorption activity of carbon dioxide that was approximately equivalent to that of Reference Example 4. The results support the present invention in which a PCP can be carried in a state that the properties of the PCP are maintained or improved.

14. Example 8

(1) Synthesis of PCP-5 ((Zr$_6$O$_4$(OH)$_4$(BDC)$_6$ (in this Regard, BDC is 1,4-Benzenedicarboxylic Acid))

A PCP-5 was synthesized by a solvothermal method. In 40 ml of dimethylformamide, 1.60 mmol of zirconium chloride and 1.60 mmol of terephthalic acid were dissolved, and the resultant mixture was heated at 393 K for 24 hours in an autoclave to perform the reaction. The precipitated precipitate was filtered, and the obtained precipitate was washed with dimethylformamide. After the methanol exchange, the resultant product was vacuum dried for 12 hours to obtain a PCP-5.

(2) Preparation of Composite Material

By using the porous body of Example 1 and the PCP-5 obtained above, a composite material was obtained by an external synthesis method. The PCP-5 (120 mg) was mixed with 1 ml of methanol to prepare a suspension. In addition, separately, the porous body of Example 1 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-5 was carried on the porous body. When physical properties of the obtained composite material were measured by a physical property measurement method, the space filling rate was 67.0% by volume, and the PCP introduction rate was 56.1% by mass.

(3) Preparation of Composite Material (Case of Irradiation with Ultrasonic Waves: Example 8-2)

By using the porous body of Example 1 and the PCP-5 obtained above, a composite material was obtained by an external synthesis method. PCP-5 (70 mg) was mixed with 2 ml of methanol, and then the obtained mixture was irradiated with ultrasonic waves for 30 seconds to prepare a suspension. In addition, separately, the porous body of Example 1 was cut to a piece with a cylindrical shape to prepare a sample. The sample (62 mg) of the porous body was immersed in the obtained suspension, and the suspension was allowed to permeate a gel for one minute. After that, the gel was taken out from the suspension, and the obtained gel was dried at 353 K for 1 hour in the air. The above-described permeation and drying operations were repeated again. Into the suspension, the PCP-5 (20 mg) and 1 ml of methanol were added, the obtained mixture was irradiated with ultrasonic waves for 30 seconds, and then the above-described permeation operation was performed again, and the resultant product was dried at 353 K for 4 hours in the air to obtain a composite material in which the PCP-4 had been carried on the porous body. When physical properties of the obtained composite material were measured by a physical property measurement method, the space filling rate was 48.1% by volume, the PCP introduction rate was 61.7% by mass, and the volume restoration rate was 0.570.

(4) Evaluation for Gas Adsorption Performance of Composite Material

Figure 8:
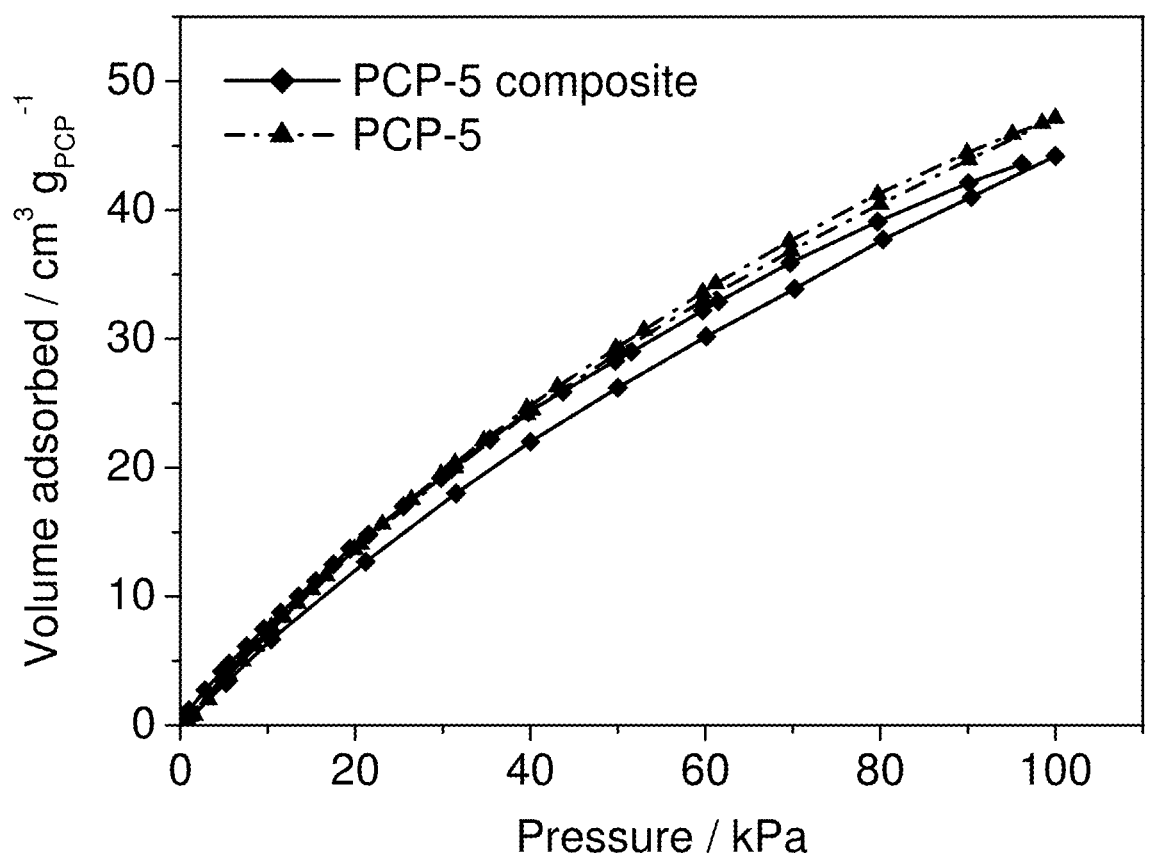
FIG. 8 is a graph showing results of the $CO_2$ adsorption/desorption isotherm measurement conducted by using composite materials of Examples.

By using the composite material obtained in Example 8-2, the adsorption activity of carbon dioxide was measured. Specifically, the measurement was performed by $CO_2$ adsorption/desorption isotherm measurement at 298 K. The results are shown in FIG. 8 (solid line: PCP-5 composite).

(5) Evaluation for Gas Adsorption Performance of PCP-5 Alone (Reference Example 5)

By using the PCP-5 obtained in Example 8, the adsorption activity of carbon dioxide was measured in a similar manner as in Example 8. The results are shown in FIG. 8 (dashed line: PCP-5).

From the results of measurement of adsorption activity of Example 8 and Reference Example 5, it was found that the composite material of Example 8 exhibited the adsorption activity of carbon dioxide that was approximately equivalent to that of Reference Example 5. The results support the present invention in which a PCP can be carried in a state that the properties of the PCP are maintained or improved.

15. Example 9

(1) Synthesis of PCP-6 (($Zr_6O_4(OH)_4(BDC-NH_2)_6$ (in this regard, $BDC-NH_2$ is 2-aminoterephthalic acid))

A PCP-6 was synthesized by a solvothermal method. In a mixture of 1.5 ml of hydrogen chloride and 155.2 ml of dimethylformamide, 3.50 g of zirconium chloride and 2.72 g of 2-aminoterephthalic acid were dissolved, and the resultant mixture was heated at 393 K for 24 hours in an autoclave to perform the reaction. The precipitated precipitate was filtered, and the obtained precipitate was washed with dimethylformamide. After the methanol exchange, the resultant product was vacuum dried for 12 hours to obtain a PCP-6.

(2) Preparation of Composite Material

By using the porous body of Example 1 and the PCP-6 obtained above, a composite material was obtained by an external synthesis method. The PCP-6 (120 mg) was mixed with 1 ml of methanol to prepare a suspension. In addition, separately, the porous body of Example 1 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-6 was carried on the porous body. When physical properties of the obtained composite material were measured by a physical property measurement method, the space filling rate was 105.9% by volume, and the PCP introduction rate was 73.0% by mass.

16. Example 10

(1) Synthesis of PCP-7 (($Fe_3F(H_2O)_2O(BDC)_3$ (in this Regard, BDC is 1,4-Benzenedicarboxylic Acid))

A PCP-7 was synthesized by a solvothermal method. In a mixture of 50 μl of 5M hydrofluoric acid and 40 ml of dimethylformamide, 1 mmol of iron(III) chloride hexahydrate and 2 mmol of terephthalic acid were dissolved, and the resultant mixture was heated at 383 K for 24 hours in an autoclave to perform the reaction. The precipitated precipitate was filtered, and the obtained precipitate was washed with dimethylformamide. After the methanol exchange, the resultant product was vacuum dried for 12 hours to obtain a PCP-7.

(2) Preparation of Composite Material

By using the porous body of Example 1 and the PCP-7 obtained above, a composite material was obtained by an external synthesis method. The PCP-7 (120 mg) was mixed with 1 ml of methanol to prepare a suspension. In addition, separately, the porous body of Example 1 was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-7 was carried on the porous body. When physical properties of the obtained composite material were measured by a physical property measurement method, the space filling rate was 39.1% by volume, the PCP introduction rate was 46.4% by mass, and the volume restoration rate was 0.735.

(3) Evaluation for Gas Adsorption Performance of Composite Material

Figure 9:
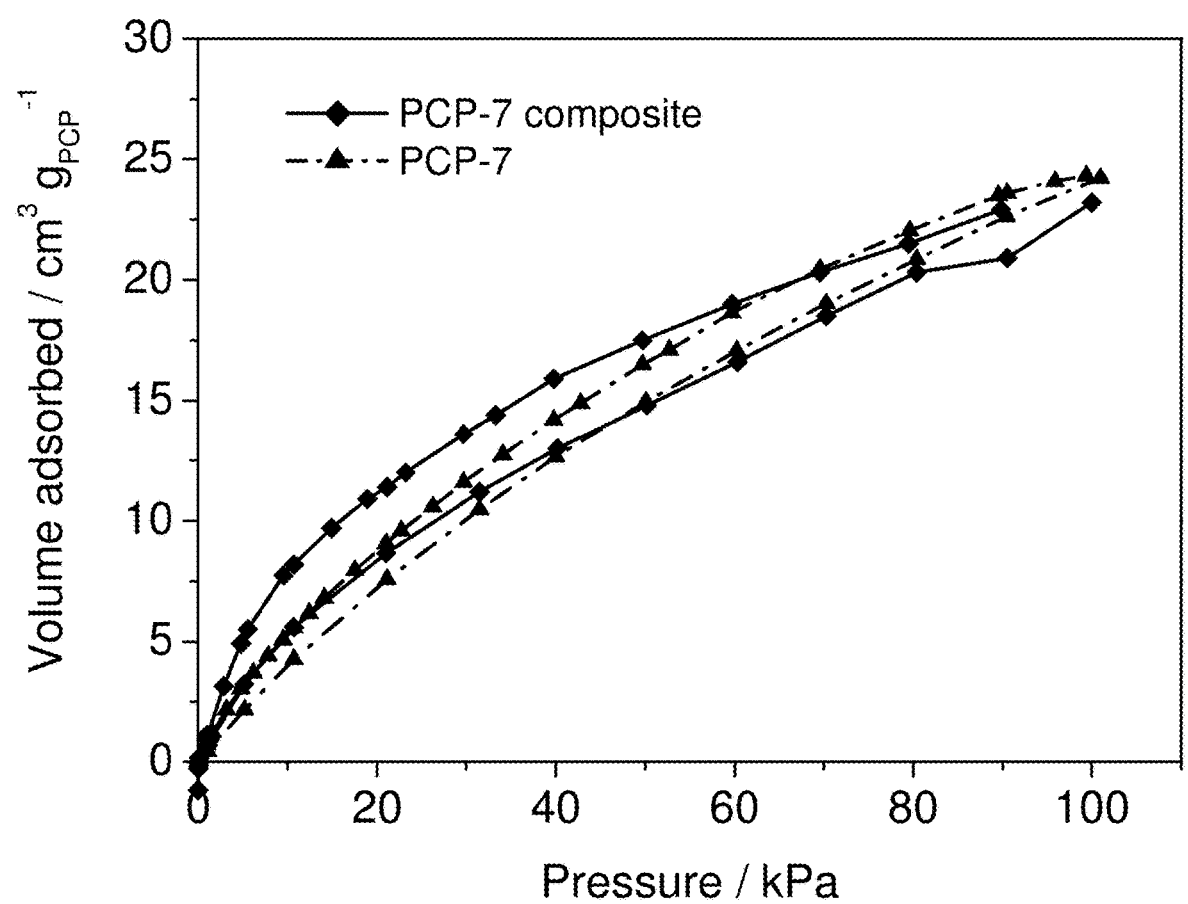
FIG. 9 is a graph showing results of the $CO_2$ adsorption/desorption isotherm measurement conducted by using composite materials of Examples.

By using the composite material obtained in Example 10, the adsorption activity of carbon dioxide was measured. Specifically, the measurement was performed by $CO_2$ adsorption/desorption isotherm measurement at 298 K. The results are shown in FIG. 9 (solid line: PCP-7 composite).

(4) Evaluation for Gas Adsorption Performance of PCP-7 Alone (Reference Example 6)

By using the PCP-7 obtained in Example 10, the adsorption activity of carbon dioxide was measured in a similar manner as in Example 10. The results are shown in FIG. 9 (dashed line: PCP-7)

From the results of measurement of adsorption activity of Example 10 and Reference Example 6, it was found that the composite material of Example 10 exhibited the adsorption activity of carbon dioxide that was equivalent to that of Reference Example 6. The results support the present invention in which a PCP can be carried in a state that the properties of the PCP are maintained or improved.

17. Example 11

(1) Synthesis of Porous Body

By using vinyltrimethoxysilane (VTMS), 4-(trimethoxysilyl)butane nitrile, and vinylmethyldimethoxysilane (VMDMS), a porous body was obtained by a sol-gel method accompanied by phase separation. In 15 ml of a 5 mM acetic acid aqueous solution, 5.0 g of urea and 1.0 g of hexadecyltrimethylammonium chloride (CTAC) were dissolved, 0.126 mol of vinyltrimethoxysilane (VTMS), 0.084 mol of 1,4-(trimethoxysilyl)butane nitrile, and 0.14 mol of vinylmethyldimethoxysilane (VMDMS) were added into the above-obtained mixture, and the resultant mixture was stirred at room temperature for 60 minutes to cause a sol reaction. After completion of the reaction, the obtained mixture was left to stand at 353 K for 9 hours and aged to cause a gel reaction. The obtained gel was washed with methanol and water, and the resultant gel was dried at 353 K for 1 hour in the air to obtain a porous body. The void ratio of the obtained porous body was 91.9% by volume.

(2) Preparation of Composite Material

By using the porous body obtained above and a PCP-3 of Example 3, a composite material was obtained by an external synthesis method. The PCP-3 (120 mg) was mixed with 1 ml of methanol to prepare a suspension. In addition, separately, the above-obtained porous body was cut to a piece with a cylindrical shape to prepare a sample. The sample (90 mg) of the porous body was immersed in the obtained suspension, and was left to stand at room temperature for 5 minutes in this state so that the suspension permeated a gel. After that, the gel was taken out from the suspension, and the obtained gel was washed with methanol, and the resultant gel was dried at 80° C. for 1 hour in the air. These permeation, washing and drying operations were repeated four more times to obtain a composite material in which the PCP-3 was carried on the porous body. The space filling rate of the obtained composite was 79.8% by volume, and the PCP introduction rate was 79.4% by mass.

18. Example 12

(1) Synthesis of PCP-E (Al(OH) (BDC-$NH_2$) (in this Regard, BDC-$NH_2$ is 2-Aminoterephthalic Acid))

A PCP-E was synthesized by a solvothermal method. In a mixture of 29 ml of dimethylformamide and 1 ml of water, 0.76 g of aluminum(III) chloride hexahydrate and 0.56 g of 2-aminoterephthalic acid were dissolved, and the obtained mixture was irradiated with ultrasonic waves for 15 minutes, and then the resultant mixture was heated at 423 K for 24 hours in an autoclave to perform the reaction. The precipitated precipitate was filtered, and the obtained precipitate was washed with methanol. After that, the resultant precipitate was dried at 353 K overnight to obtain a PCP-E.

(2) Preparation of Composite Material

By using the porous body of Example 1 and the PCP-E obtained above, a composite material was obtained by an external synthesis method. The PCP-E (60 mg) was mixed with 2 ml of methanol to prepare a suspension. In addition, separately, the porous body of Example 1 was cut to a piece with a cylindrical shape to prepare a sample. The sample (53 mg) of the porous body was immersed in the obtained suspension, and the suspension was allowed to permeate a gel for one minute. After that, the gel was taken out from the suspension, and the obtained gel was dried at 353 K for 1 hour in the air. The above-described permeation and drying operations were repeated again. Into the suspension, the PCP-E (20 mg) and 1 ml of methanol were added, the above-described permeation operation was performed again on the obtained mixture, and the resultant product was dried at 353 K for 4 hours in the air to obtain a composite material in which the PCP-E had been carried on the porous body. When physical properties of the obtained composite material were measured by a physical property measurement method, the space filling rate was 38.0% by volume, the PCP introduction rate was 50.7% by mass, and the volume restoration rate was 0.862.

(3) Evaluation for Gas Adsorption Performance of Composite Material

Figure 10:
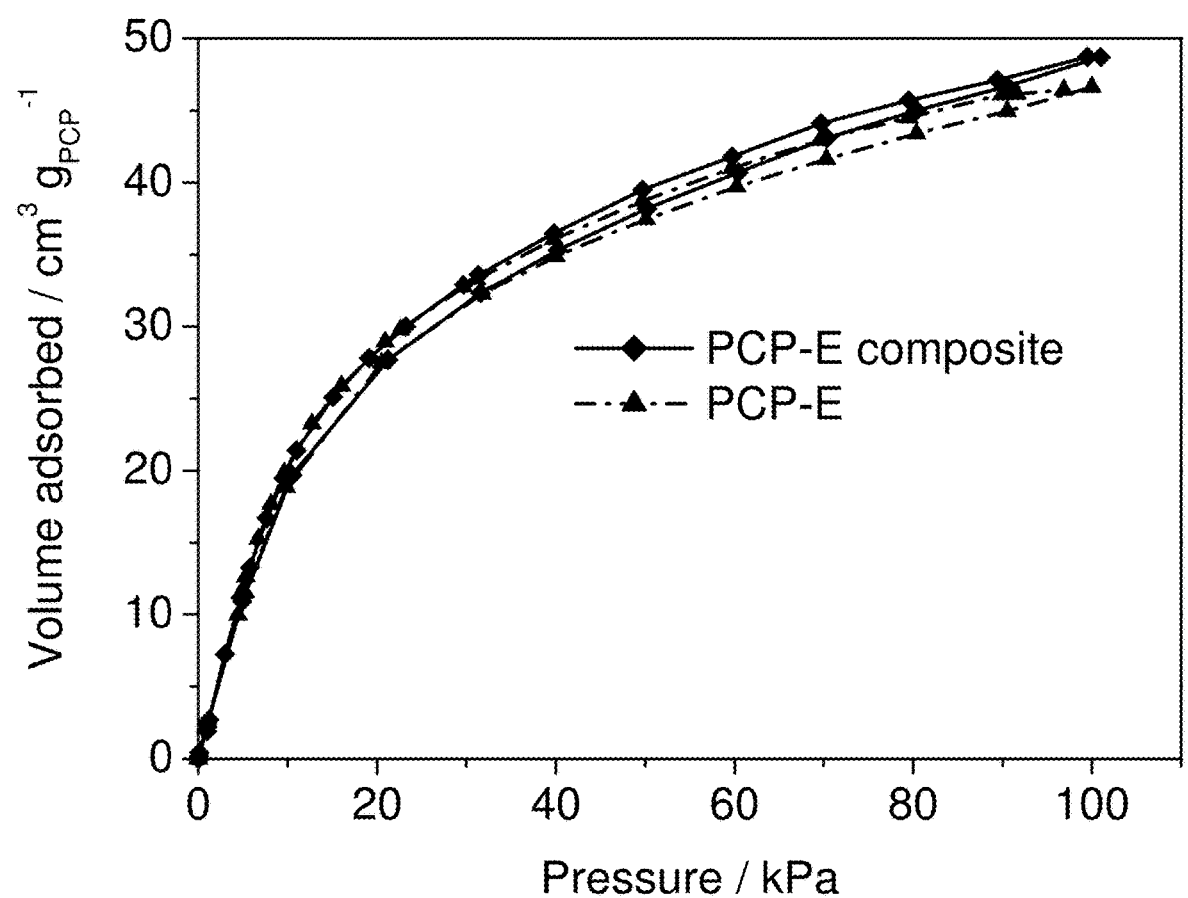
FIG. 10 is a graph showing results of the $CO_2$ adsorption/desorption isotherm measurement conducted by using composite materials of Examples.

By using the composite material obtained in Example 12, the adsorption activity of carbon dioxide was measured. Specifically, the measurement was performed by $CO_2$ adsorption/desorption isotherm measurement at 298 K. The results are shown in FIG. 10 (solid line: PCP-E composite).

(4) Evaluation for Gas Adsorption Performance of PCP-E Alone (Reference Example 7)

By using the PCP-E obtained in Example 12, the adsorption activity of carbon dioxide was measured in a similar manner as in Example 12. The results are shown in FIG. 10 (dashed line: PCP-E).

From the results of measurement of adsorption activity of Example 12 and Reference Example 7, it was found that the composite material of Example 12 exhibited the adsorption activity of carbon dioxide that was slightly higher than that of Reference Example 7. The results support the present invention in which a PCP can be carried in a state that the properties of the PCP are maintained or improved.

19. Example 13

(1) Synthesis of PCP-F ($Al_3OCl(H_2O)_2$(BDC-$NH_2$)$_3$ (in this regard, BDC-$NH_2$ is 2-aminoterephthalic acid))

A PCP-F was synthesized by a solvothermal method. In 80 ml of dimethylformamide, 0.97 g of aluminum(III) chloride hexahydrate and 1.09 g of 2-aminoterephthalic acid were dissolved, and the obtained mixture was irradiated with ultrasonic waves for 15 minutes, and then the resultant mixture was stirred at room temperature for 1 hour. After that, the mixture was heated at 393 K for 24 hours in an autoclave to perform the reaction. The precipitated precipitate was filtered, and the obtained precipitate was washed with methanol. The resultant precipitate was dried at 353 K for 12 hours to obtain a PCP-C.

(2) Preparation of Composite Material

By using the porous body of Example 1 and the PCP-F obtained above, a composite material was obtained by an external synthesis method. PCP-F (70 mg) was mixed with 2 ml of methanol, and then the obtained mixture was irradiated with ultrasonic waves for 30 seconds to prepare a suspension. In addition, separately, the porous body of Example 1 was cut to a piece with a cylindrical shape to prepare a sample. The sample (63 mg) of the porous body was immersed in the obtained suspension, and the suspension was allowed to permeate a gel for one minute. After that, the gel was taken out from the suspension, and the obtained gel was dried at 353 K for 1 hour in the air. The above-described permeation and drying operations were repeated again. Into the suspension, the PCP-F (20 mg) and 1 ml of methanol were added, the obtained mixture was irradiated with ultrasonic waves for 30 seconds, and then the above-described permeation operation was performed again, and the resultant product was dried at 353 K for 4 hours in the air to obtain a composite material in which the PCP-F had been carried on the porous body. When physical properties of the obtained composite material were measured by a physical property measurement method, the space filling rate was 33.8% by volume, the PCP introduction rate was 47.5% by mass, and the volume restoration rate was 0.735.

20. Example 14

(1) Synthesis of PCP-G ($Fe_3O(BPDC)_3Cl.nH_2O$ (in this Regard, BPDC is 4,4'-Biphenyldicarboxylic Acid))

A PCP-G was synthesized by a solvothermal method. In 5 ml of dimethylformamide, 0.270 g of iron(III) chloride hexahydrate and 0.242 g of 4,4'-biphenyldicarboxylic acid were dissolved, and the obtained mixture was irradiated with ultrasonic waves for 15 minutes, and then the resultant mixture was heated at 423 K for 12 hours in an autoclave to perform the reaction. The precipitated precipitate was filtered, and the obtained precipitate was washed with methanol. The obtained powder was dispersed in 40 ml of methanol, and the obtained dispersion was stirred overnight. The powder was filtered, washed with methanol, and the resultant powder was dried at 353 K for 12 hours to obtain a PCP-G.

(2) Preparation of Composite Material

By using the porous body of Example 1 and the PCP-G obtained above, a composite material was obtained by an external synthesis method. PCP-G (70 mg) was mixed with 2 ml of methanol, and then the obtained mixture was irradiated with ultrasonic waves for 30 seconds to prepare a suspension. In addition, separately, the porous body of Example 1 was cut to a piece with a cylindrical shape to prepare a sample. The sample (62 mg) of the porous body was immersed in the obtained suspension, and the suspension was allowed to permeate a gel for one minute. After that, the gel was taken out from the suspension, and the obtained gel was dried at 353 K for 1 hour in the air. The above-described permeation and drying operations were repeated again. Into the suspension, the PCP-G (20 mg) and 1 ml of methanol were added, the obtained mixture was irradiated with ultrasonic waves for 30 seconds, and then the above-described permeation operation was performed again, and the resultant product was dried at 353 K for 4 hours in the air to obtain a composite material in which the PCP-G had been carried on the porous body. When physical properties of the obtained composite material were measured by a physical property measurement method, the space filling rate was 29.1% by volume, the PCP introduction rate was 53.7% by mass, and the volume restoration rate was 0.862.

(3) Evaluation for Gas Adsorption Performance of Composite Material

Figure 11:
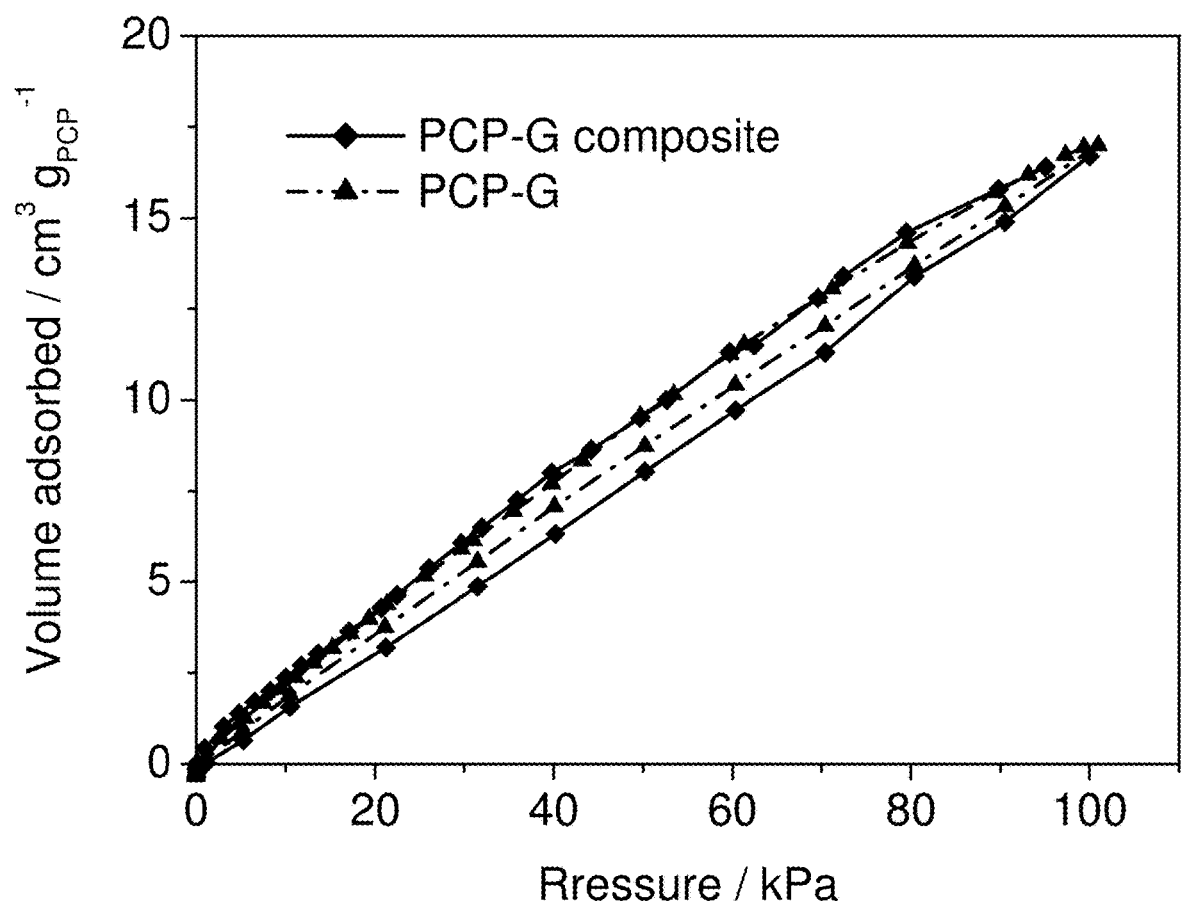
FIG. 11 is a graph showing results of the $CO_2$ adsorption/desorption isotherm measurement conducted by using composite materials of Examples.

By using the composite material obtained in Example 14, the adsorption activity of carbon dioxide was measured. Specifically, the measurement was performed by $CO_2$ adsorption/desorption isotherm measurement at 298 K. The results are shown in FIG. 11 (solid line: PCP-G composite).

(4) Evaluation for Gas Adsorption Performance of PCP-G Alone (Reference Example 8)

By using the PCP-G obtained in Example 14, the adsorption activity of carbon dioxide was measured in a similar manner as in Example 14. The results are shown in FIG. 11 (dashed line: PCP-G).

From the results of measurement of adsorption activity of Example 14 and Reference Example 8, it was found that the composite material of Example 14 exhibited the adsorption activity of carbon dioxide that was equivalent to that of Reference Example 8. The results support the present invention in which a PCP can be carried in a state that the properties of the PCP are maintained or improved.

21. Example 15

(1) Synthesis of PCP-H ($Ti_8O_8(OH)_4$ $(BDC-NH_2)_6$ (in this Regard, $BDC-NH_2$ is 2-Aminoterephthalic Acid))

A PCP-H was synthesized by a solvothermal method. In a mixture of 18 ml of dimethylformamide and 2 ml of methanol, 600 µl of tetrabutyl orthotitanate and 0.500 g of 2-aminoterephthalic acid were dissolved, and the obtained mixture was irradiated with ultrasonic waves for 15 minutes, and then the resultant mixture was heated at 423 K for 24 hours in an autoclave to perform the reaction. The precipitated precipitate was filtered, and the obtained precipitate was washed with methanol. After that, the resultant precipitate was dried at 353 K for 12 hours to obtain a PCP-H.

(2) Preparation of Composite Material

By using the porous body of Example 1 and the PCP-H obtained above, a composite material was obtained by an external synthesis method. PCP-H (70 mg) was mixed with 2 ml of methanol, and then the obtained mixture was irradiated with ultrasonic waves for 30 seconds to prepare a suspension. In addition, separately, the porous body of Example 1 was cut to a piece with a cylindrical shape to prepare a sample. The sample (60 mg) of the porous body was immersed in the obtained suspension, and the suspension was allowed to permeate a gel for one minute. After that, the gel was taken out from the suspension, and the obtained gel was dried at 353 K for 1 hour in the air. The above-described permeation and drying operations were repeated again. Into the suspension, the PCP-H (20 mg) and 1 ml of methanol were added, the obtained mixture was irradiated with ultrasonic waves for 30 seconds, and then the above-described permeation operation was performed again, and the resultant product was dried at 353 K for 4 hours in the air to obtain a composite material in which the PCP-H had been carried on the porous body. When physical properties of the obtained composite material were measured by a physical property measurement method, the space filling rate was 25.3% by volume, the PCP introduction rate was 50.8% by mass, and the volume restoration rate was 0.862.

22. Example 16

(1) Evaluation of Influence of Solvent for Preparing Composite Material

By using the porous body of Example 1 and the PCP-F obtained above, a composite material was obtained by an external synthesis method. PCP-F (60 mg) was mixed with 2 ml of dimethylformamide, and then the obtained mixture was irradiated with ultrasonic waves for 30 seconds to prepare a suspension. In addition, separately, the porous body of Example 1 was cut to a piece with a cylindrical shape to prepare a sample. The sample (61 mg) of the porous body was immersed in the obtained suspension, and the suspension was allowed to permeate a gel for one minute. After that, the gel was taken out from the suspension, and the obtained gel was dried at 353 K for 3 hours in the air. The above-described permeation and drying operations were repeated again. Into the suspension, the PCP-F (20 mg) and 1 ml of dimethylformamide were added, the obtained mixture was irradiated with ultrasonic waves for 30 seconds, and then the above-described permeation operation was performed again, and the resultant product was dried at 353 K overnight in the air to obtain a composite material in which the PCP-F had been carried on the porous body. When physical properties of the obtained composite material were measured by a physical property measurement method, the space filling rate was 36.4% by volume, the PCP introduction rate was 45.8% by mass, and the volume restoration rate was 0.735.

From the results of physical properties evaluation of composite materials of Example 13 and Comparative Example 16, it was found that a composite material having a high filling amount and a shrunken volume can be obtained even when the PCP suspending solvent is changed.

The PCP (kind of metal ion+organic ligand), the porous body (kind of monomer), the void ratio of the porous body, the synthesis method of PCP, the space filling rate of the composite material, and the PCP introduction rate, which are used in the above-described Examples and Comparative Example, are summarized in the following Table.

TABLE 1

| | PCP | Porous body | Void ratio | Synthesis method | Space filling rate | PCP introduction rate | Volume restoration rate |
|---|---|---|---|---|---|---|---|
| Example 1 | PCP-1 (copper nitrate trihydrate + 5-heptafluoropropyl isophthalic acid) | vinyltrimethoxysilane + vinylmethyldimethoxysilane | 84.5% by Volume | External | 112.8% by Volume | 77.0% by mass | 0.735 |
| Example 2 | PCP-2 (copper nitrate trihydrate +, 3,5-benzenetricarboxylic acid) | vinyltrimethoxysilane + vinylmethyldimethoxysilane | 84.5% by Volume | External | 109% by Volume | 83.4% by mass | 0.59 |
| Example 3 | PCP-3 (copper nitrate trihydrate + 5-heptafluoropropyl isophthalic acid) | dimethyldimethoxysilane + 4-(trimethoxysilyl)butane nitrile | 71.7% by Volume | External | 65.3% by Volume | 69.2% by mass | — |
| Example 4 | PCP-3 (copper nitrate trihydrate + 5-heptafluoropropyl isophthalic acid) | dimethyldimethoxysilane + vinyltrimethoxysilane + 4-(trimethoxysilyl)butane nitrile | 86.5% by Volume | External | 85.5% by Volume | 80.1% by mass | — |
| Example 5 | PCP-3 (copper nitrate trihydrate + 5-heptafluoropropyl isophthalic acid) | dimethyldimethoxysilane + methyltrimethoxysilane + 4-(trimethoxysilyl)butane nitrile | 84.5% by Volume | External | 74.8% by Volume | 75.8% by mass | — |
| Example 6 | PCP-1 (copper nitrate trihydrate + 5-heptafluoropropyl isophthalic acid) | vinyltrimethoxysilane + vinylmethyldimethoxysilane | 84.5% by Volume | Internal | 41.4% by Volume | 60.0% by mass | — |
| Example 7 | PCP-4 (cobalt nitrate hexahydrate + 2-methylimidazole) | vinyltrimethoxysilane + vinylmethyldimethoxysilane | 84.5% by Volume | External | 114.6% by Volume | 64.6% by mass | |
| Example 7-2 | PCP-4 (cobalt nitrate hexahydrate + 2-methylimidazole) | vinyltrimethoxysilane + vinylmethyldimethoxysilane | 84.5% by Volume | External | 60.0% by Volume | 60.0% by mass | 0.759 |
| Example 8 | PCP-5 (zirconium chloride + terephthalic acid) | vinyltrimethoxysilane + vinylmethyldimethoxysilane | 84.5% by Volume | External | 67.0% by Volume | 56.1% by mass | — |
| Example 8-2 | PCP-5 (zirconium chloride + terephthalic acid) | vinyltrimethoxysilane + vinylmethyldimethoxysilane | 84.5% by Volume | External | 48.1% by Volume | 61.7% by mass | 0.570 |

TABLE 1-continued

| | PCP | Porous body | Void ratio | Synthesis method | Space filling rate | PCP introduction rate | Volume restoration rate |
|---|---|---|---|---|---|---|---|
| Example 9 | PCP-6 (zirconium chloride + 2-amino-terephthalic acid) | vinyltri-methoxy-silane + vinylmethyl-dimethoxy-silane | 84.5% by Volume | External | 105.9% by Volume | 73.0% by mass | — |
| Example 10 | PCP-7 (iron (III) chloride hexahydrate + terephthalic acid) | vinyl-trimethoxy-silane + vinylmethyl-dimethoxy-silane | 84.5% by Volume | External | 39.1% by Volume | 46.4% by mass | 0.735 |
| Example 11 | PCP-3 (copper nitrate trihydrate + 5-heptafluoro-propyl isophthalic acid) | vinyltri-methoxy-silane + 4-(trimethoxy-silyl)butane nitrile + vinylmethyl-dimethoxy-silane | 91.9% by Volume | External | 79.8% by Volume | 79.4% by mass | — |
| Example 12 | PCP-E (aluminum (III) chloride hexahydrate + 2-amino-terephthalic acid) | vinyltri-methoxy-silane + vinylmethyl-dimethoxy-silane | 84.5% by Volume | External | 38.0体積% | 50.7質量% | 0.862 |
| Example 13 | PCP-F (aluminum (III) chloride hexahydrate + 2-amino-terephthalic acid) | vinyltri-methoxy-silane + vinylmethyl-dimethoxy-silane | 84.5% by Volume | External | 33.8% by Volume | 47.5% by mass | 0.735 |
| Example 14 | PCP-G (iron (III) chloride hexahydrate + 4,4'-biphenyl dicarboxylic acid) | vinyltri-methoxy-silane + vinylmethyl-dimethoxy-silane | 84.5% by Volume | External | 29.1% by Volume | 53.7% by mass | 0.862 |
| Example 15 | PCP-H (tetrabutyl orthotitanate + 2-amino-terephthalic acid) | vinyltri-methoxy-silane + vinylmethyl-dimethoxy-silane | 84.5% by Volume | External | 25.2% by Volume | 50.8% by mass | 0.862 |
| Example 16 | PCP-F (aluminum (III) chloride hexahydrate + 2-amino-terephthalic acid) | vinyltri-methoxy-silane + vinylmethyl-dimethoxy-silane | 84.5% by Volume | External | 36.4% by Volume | 45.8% by mass | 0.735 |
| Comparative Example 1 | PCP-1 (copper nitrate trihydrate + 5-heptafluoro-propyl isophthalic acid) | tetraethoxy-silane | 43.0% by Volume | Internal | 43.7% by Volume | 20.0% by mass | 1.00 |

As compared with Comparative Example 1 including tetraethoxysilane, with respect to the porous body, which is obtained by copolymerizing a dialkoxysilane and a trialkoxysilane, of each of Examples 1 to 16 of the present invention, the void ratio of the porous body is favorable, the void ratio is increased by as much as 28.7% by volume at least in Example 3, and in Example 11, the void ratio is increased by as much as 48.9% by volume comparing to that of Comparative Example 1 and the porous body has voids twice or more those of Comparative Example 1. As is apparent from Examples 1 to 16, regardless of the kind of the PCP, the porous body of the present invention can carry the PCP.

Further, when comparing Example 1 in which the synthesized PCP was carried on a porous body with Example 6 in which the PCP was synthesized in a porous body, it can be understood that carrying the synthesized PCP in a porous body is more excellent rather than synthesizing the PCP in a porous body because the space filling rate and the PCP introduction rate become higher.

In addition, the amount of the PCP to be carried on the porous body of the present invention, that is, the PCP introduction rate is increased by 26.4% by mass even in Example 10 having the least amount comparing to that of Comparative Example 1, and the PCP can be carried in the porous body in an amount twice or more that of Comparative Example 1. In Example 2, the amount of the PCP to be carried is increased by 63.4% by mass, and the PCP can be carried in the porous body in an amount 4 times or more that of Comparative Example 1.

The invention claimed is:

1. A composite material, comprising:
a porous body having pores inside the porous body; and
a porous coordination polymer compound,
the porous body having a network structure of Si—O bonds obtained by copolymerizing a dialkoxysilane and a trialkoxysilane, and
the porous coordination polymer compound being carried in the pores of the porous body.

2. The composite material according to claim 1, wherein the porous body has a void ratio of 50% by volume or more.

3. The composite material according to claim 1, wherein the pores of the porous body have an average pore diameter of 5 μm or more and 20 μm or less.

4. The composite material according to claim 1, wherein a ratio of a volume of the composite material to a volume of the porous body is 1.0 or less.

5. The composite material according to claim 1, wherein a complex introduction rate indicated by a mass of the porous coordination polymer compound to the total mass of the composite material is 40% by mass or more.

6. The composite material according to claim 1, wherein the porous body has partial structures represented by the following formulas (M1) and (M2):

[Chemical formula 1]

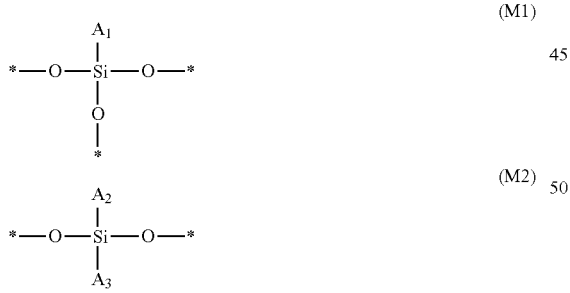

wherein $A_1$ is a functional group selected from the group consisting of a vinyl group, a cyano group, an alkyl group having 1 to 5 carbon atoms, an amino group, a mercapto group, a fluoro group, an aryl group, and an epoxy group; $A_2$ and $A_3$ are functional groups selected from the group consisting of a vinyl group, a cyano group, an alkyl group having 1 to 5 carbon atoms, an amino group, a mercapto group, a fluoro group, an aryl group, and an epoxy group, and may be the same as or different from each other; and the symbol "*" represents a chemical bond and means to bond to adjacent Si.

7. The composite material according to claim 6, wherein the formula (M1) is one or more kinds selected from the group consisting of the following formulas (M1-1), (M1-2), and (M1-3):

[Chemical formula 2]

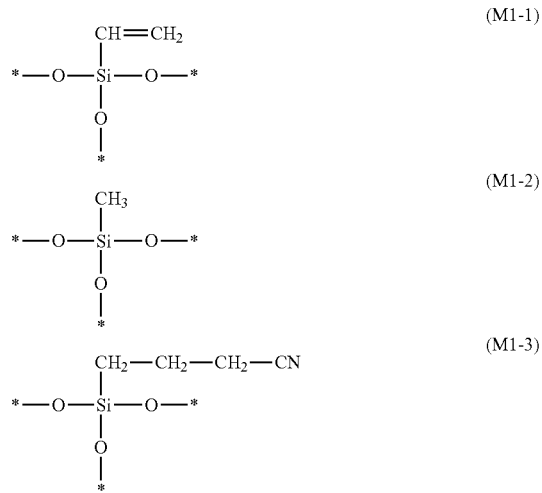

wherein the symbol "*" represents a chemical bond and means to bond to adjacent Si; and
the formula (M2) is one or more kinds selected from the group consisting of the following formulas (M2-1), (M2-2), and (M2-3):

[Chemical formula 3]

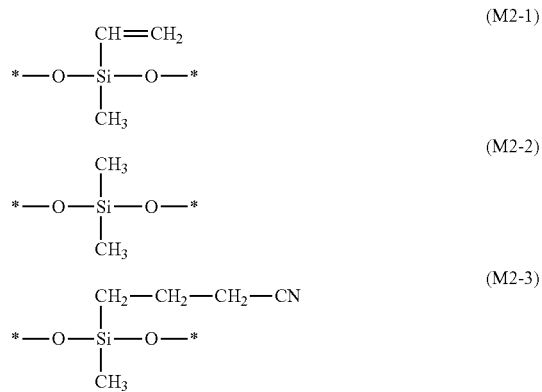

wherein the symbol "*" represents a chemical bond and means to bond to adjacent Si.

8. The composite material according to claim 1, wherein the porous coordination polymer compound has a structure in which an organic ligand is coordinated to a metal ion,
the metal ion is a divalent to tetravalent metal ion, and
the organic ligand is a compound having a carboxyl group, a pyridyl group, or an imidazole group.

9. The composite material according to claim 1, wherein the porous coordination polymer compound is a porous coordination polymer compound containing a divalent to tetravalent metal ion and a divalent aromatic carboxylic acid having two COOH groups at meta positions.

10. The composite material according to claim 9, wherein the porous coordination polymer compound has a structure represented by the following formula (P1):

[Chemical formula 4]

$$\{M(OOC-Y_1-COO)\}_2 \quad (P1)$$

wherein M is a divalent, trivalent, or tetravalent metal ion selected from the group consisting of $Cu^{2+}$, $Zn^{2+}$, $Ru^{2+}$, $Rh^{2+}$, $Mo^{2+}$, $Fe^{3+}$, $Al^{3+}$, $Ti^{4+}$, and $Co^{3+}$; and $Y_1$ represents a divalent aromatic group having adjacent two COOH groups at meta positions.

11. A gas adsorbent, comprising a composite material according to claim 1.

12. A method for producing a composite material containing a porous body having pores inside the porous body and a porous coordination polymer compound, according to claim 1, the method comprising:
providing a porous body having a network structure of Si-O bonds obtained by copolymerizing a dialkoxysilane and a trialkoxysilane, and
carrying a porous coordination polymer compound in the pores of the porous body via a solvent.

13. The method for producing a composite material according to claim 12, further comprising:
a washing step of removing the porous coordination polymer compound that has not been carried on the porous body after the porous coordination polymer compound is brought into contact with the porous body; and
a drying step of drying the solvent.

14. The method for producing a composite material according to claim 13, wherein
the solvent has a property of swelling the porous body.

15. The method for producing a composite material according to claim 14, wherein
the solvent is at least one kind selected from the group consisting of methanol, ethanol, 1-propanol, 2-propanol, 1-butanol, 2-butanol, benzene, hexane, acetaldehyde, acetone, cyclohexane, and N,N-dimethylformamide.

16. The method for producing a composite material according to claim 12, wherein
the porous body
has partial structures represented by the following formulas (M1) and (M2):

[Chemical formula 5]

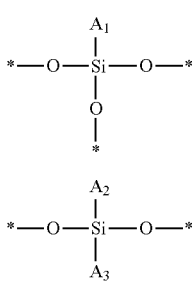

wherein $A_1$ is a functional group selected from the group consisting of a vinyl group, a cyano group, an alkyl group having 1 to 5 carbon atoms, an amino group, a mercapto group, a fluoro group, an aryl group, and an epoxy group; $A_2$ and $A_3$ are functional groups selected from the group consisting of a vinyl group, a cyano group, an alkyl group having 1 to 5 carbon atoms, an amino group, a mercapto group, a fluoro group, an aryl group, and an epoxy group, and may be the same as or different from each other; and the symbol "*" represents a chemical bond and means to bond to adjacent Si,
and
is produced by copolymerizing a compound represented by the following formula (M3) with a compound represented by the following formula (M4):

[Chemical formula 6]

wherein $R_1$ to $R_5$ each are an alkyl group having 1 to 5 carbon atoms and may be the same as or different from each other, and $A_1$ to $A_3$ are the same as the above.

17. The method for producing a composite material according to claim 13, comprising:
a dispersion liquid adjustment step of adjusting a dispersion liquid of the porous coordination polymer compound by dispersing the porous coordination polymer compound in the solvent; and
a contact step of bringing the dispersion liquid into contact with the porous body to introduce the porous coordination polymer compound into the pores.

18. The method for producing a composite material according to claim 17, wherein
in the contact step, the porous body is brought into contact with the dispersion liquid while being swelled.

19. The method for producing a composite material according to claim 17, further comprising
a drying step of removing the solvent from the porous body after the contact step.

20. The method for producing a composite material according to claim 17, wherein
in the contact step, when a volume of the porous body before the contact is taken as V0 and a volume of the porous body after the contact is taken as V1, a volume expansion rate (V1/V0) of the porous body is in a range of 1.2 to 2.0.

* * * * *